United States Patent
Kasahara

(10) Patent No.: US 8,982,243 B2
(45) Date of Patent: Mar. 17, 2015

(54) IMAGE PROCESSING DEVICE AND IMAGE CAPTURING DEVICE

(75) Inventor: Ryosuke Kasahara, Kanagawa (JP)

(73) Assignee: Ricoh Company, Limited, Tokyo (JP)

( * ) Notice: Subject to any disclaimer, the term of this patent is extended or adjusted under 35 U.S.C. 154(b) by 282 days.

(21) Appl. No.: 13/581,905

(22) PCT Filed: Feb. 24, 2011

(86) PCT No.: PCT/JP2011/054832
§ 371 (c)(1),
(2), (4) Date: Sep. 27, 2012

(87) PCT Pub. No.: WO2011/108620
PCT Pub. Date: Sep. 9, 2011

(65) Prior Publication Data
US 2013/0010146 A1    Jan. 10, 2013

(30) Foreign Application Priority Data

Mar. 2, 2010   (JP) ................. 2010-045916

(51) Int. Cl.
*H04N 9/68* (2006.01)
*H04N 5/228* (2006.01)
*H04N 1/407* (2006.01)
*G06T 5/00* (2006.01)

(52) U.S. Cl.
CPC ............ *H04N 1/407* (2013.01); *G06T 5/007* (2013.01)
USPC ......... 348/234; 348/222.1; 348/235; 348/236

(58) Field of Classification Search
CPC ............ G05B 2219/4701; G05B 2219/37572; H04N 1/407; H04N 13/0022; G06T 5/007; G06F 19/321
USPC ................. 348/222.1, 234, 235, 236
See application file for complete search history.

(56) References Cited

U.S. PATENT DOCUMENTS

| | | | |
|---|---|---|---|
| 2003/0016306 A1 | 1/2003 | Ogata et al. | |
| 2005/0201608 A1 | 9/2005 | Umeki et al. | |
| 2005/0226526 A1 | 10/2005 | Mitsunaga | |
| 2007/0053607 A1* | 3/2007 | Mitsunaga | 382/274 |
| 2007/0229863 A1 | 10/2007 | Ono et al. | |
| 2008/0284878 A1 | 11/2008 | Kosakai et al. | |

(Continued)

FOREIGN PATENT DOCUMENTS

| | | |
|---|---|---|
| CN | 101401024 A | 4/2009 |
| CN | 101448169 A | 6/2009 |

(Continued)

OTHER PUBLICATIONS

Extended European Search Report issued Dec. 7, 2012 in Patent Application No. 11750729.3.

(Continued)

*Primary Examiner* — Twyler Haskins
*Assistant Examiner* — Padma Haliyur
(74) *Attorney, Agent, or Firm* — Oblon, McClelland, Maier & Neustadt, L.L.P.

(57) ABSTRACT

An image processing device includes a dynamic range compressor that changes a characteristic of a tone curve depending on a position on input image data so as to compress a dynamic range of the image data, and a coordinate converter that converts coordinates of the image data of which the dynamic range has been compressed.

17 Claims, 25 Drawing Sheets

(56) References Cited

U.S. PATENT DOCUMENTS

| | | |
|---|---|---|
| 2009/0190855 A1 | 7/2009 | Kasahara |
| 2009/0295937 A1* | 12/2009 | Sato et al. ................. 348/222.1 |
| 2010/0020205 A1 | 1/2010 | Ishida et al. |
| 2010/0310189 A1 | 12/2010 | Wakazono et al. |

FOREIGN PATENT DOCUMENTS

| | | |
|---|---|---|
| EP | 1 494 462 A1 | 1/2005 |
| EP | 1 755 331 A1 | 2/2007 |
| JP | 2002-262130 | 9/2002 |
| JP | 2005-341527 | 12/2005 |
| JP | 2008-042390 | 2/2008 |
| JP | 2008-072450 | 3/2008 |
| JP | 4161719 | 8/2008 |
| JP | 4214457 | 11/2008 |
| JP | 2009-177703 | 8/2009 |
| JP | 2009-266003 | 11/2009 |
| WO | WO 2009/072537 A1 | 6/2009 |

OTHER PUBLICATIONS

International Search Report issued Apr. 5, 2011 in PCT/JP2011/054832 filed Feb. 24, 2011.

Chinese Office Action issued Aug. 5, 2014, in China Patent Application No. 201180011720.2 (with English translation).

* cited by examiner

640 PIXELS
480 PIXELS

23

27

FIG.32
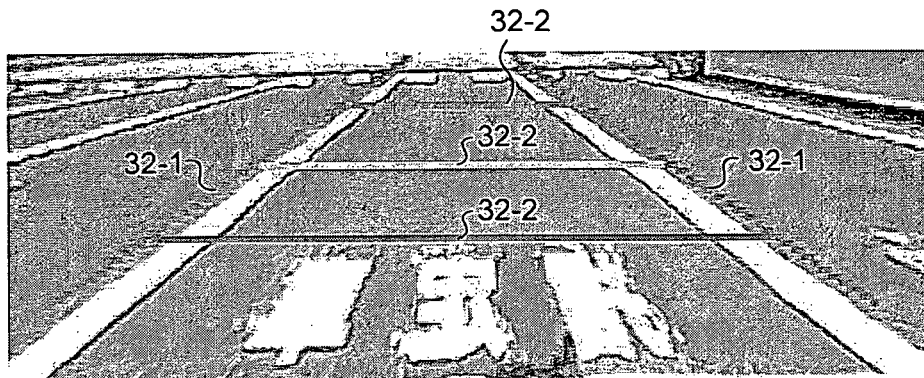
FIG.33
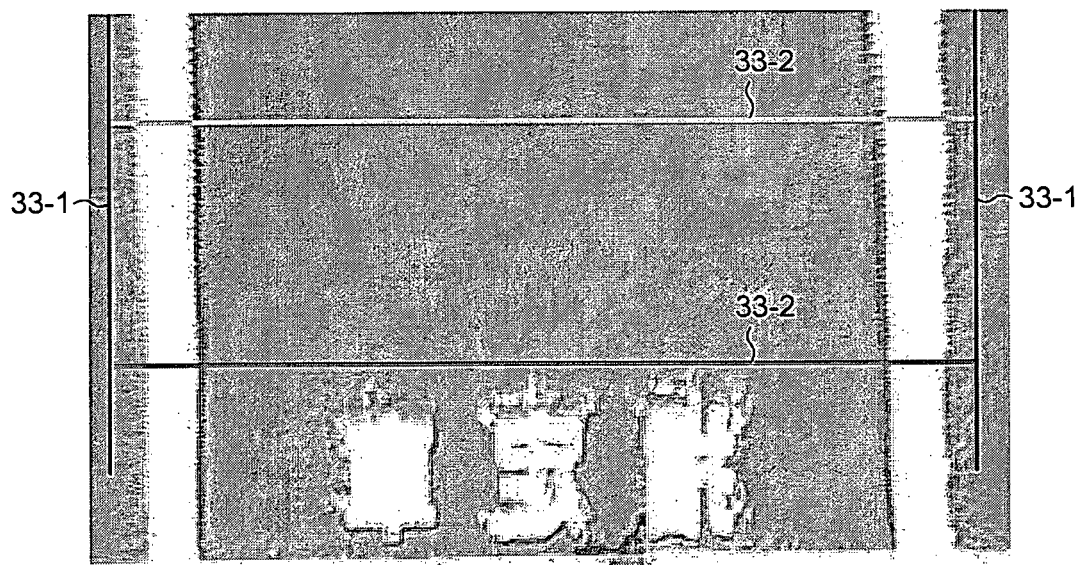

IMAGE PROCESSING DEVICE AND IMAGE CAPTURING DEVICE

TECHNICAL FIELD

The present invention relates to an image processing device and an image capturing device.

BACKGROUND ART

Recently, for example, in rear monitors of vehicles, a technique has been known by which an image captured with a fisheye camera having a wide view of angle and large distortion is coordinate-converted so as to correct image distortion and obtain an image easy to see for users (e.g., refer to Japanese Patent Application Laid-open No. 2009-177703).

In general, sensors, such as image sensors capturing images, have widened dynamic ranges while output systems, such as displays outputting the captured images, have narrow dynamic ranges. As for a color depth represented by the number of output bits per pixel, a sensor has a 12-bit color depth while an output system has an 8-bit color depth, for example.

Under such circumstances, when a captured image that includes outdoor and indoor areas or shady and sunny areas and has a wide dynamic range is output by an output system, underexposed (blocked up shadows) and overexposed (blown out highlights) areas occur. In order to address the problem, a dynamic range compression technique by which a dynamic range of a captured image is compressed according to characteristics of an output system is disclosed in Japanese Patents No. 4161719 and No. 4214457.

In general, the dynamic range compression is carried out in a succeeding stage (just before an output to an output system) to image processing because the dynamic range compression is carried out according to the characteristics of the output system and the number of bits capable of being handled in various image processes needs to be increased. Hence, when the above-described coordinate conversion and dynamic range compression are carried out, the coordinate conversion is first carried out and followed by the dynamic range compression.

However, when the coordinate conversion and the dynamic range compression are carried out in this order, ringing or artifacts occur in an image that has been subjected to dynamic range compression due to an effect of an enlargement rate of an image that has been coordinate-converted. As a result, image quality deteriorates.

DISCLOSURE OF INVENTION

To solve the above described problems and achieve an object, an image processing device according to an aspect of the present invention includes: a dynamic range compressor that changes a characteristic of a tone curve depending on a position on input image data so as to compress a dynamic range of the image data; and a coordinate converter that converts coordinates of the image data of which the dynamic range has been compressed.

According to another aspect of the present invention, an image capturing device includes: the above described image processing device; a wide angle optical system; and an image sensor that converts a subject image entered through the wide angle optical system into image data and inputs the converted image data to the image processing device.

BRIEF DESCRIPTION OF DRAWINGS

FIG. 32 illustrates exemplary image data obtained by correcting distortion of the image data illustrated in FIG. 31.

FIG. 33 illustrates exemplary image data obtained by converting a normal viewpoint into a top viewpoint in the image data illustrated in FIG. 31.

BEST MODE(S) FOR CARRYING OUT THE INVENTION

Embodiments of an image processing device and an image capturing device according to the present invention are described in detail with reference to the accompanying drawings below.

First Embodiment

In a first embodiment, an image processing device that compresses a dynamic range of image data and thereafter performs coordinate conversion will be described.

First, a structure of the image processing device according to the first embodiment is described.

Figure 1:
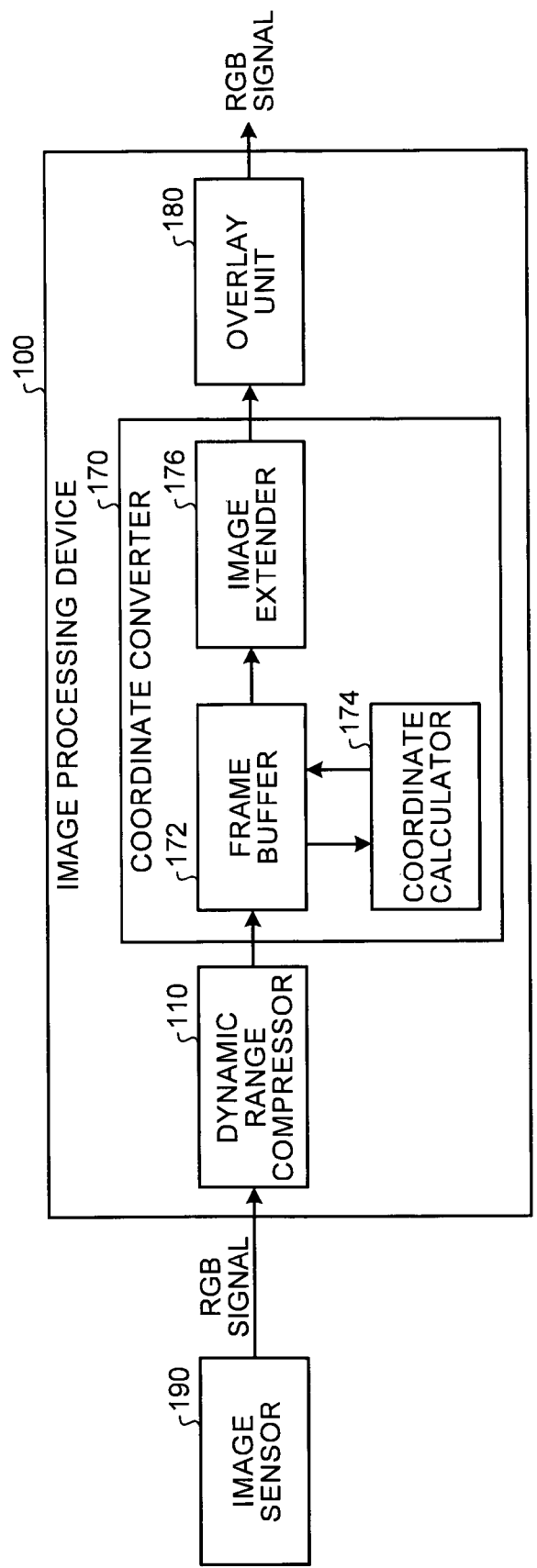
FIG. 1 is a block diagram illustrating an exemplary structure of an image processing device according to a first embodiment.

FIG. 1 is a block diagram illustrating an exemplary structure of an image processing device 100 of the first embodiment. As illustrated in FIG. 1, the image processing device 100 performs image processing on an RGB signal (hereinafter may be referred to as "image data") input from an image sensor 190 that captures image data and is composed of, for example, charge coupled devices (CCDs) or complementary metal-oxide semiconductors (CMOSes). The image processing device 100 includes a dynamic range compressor 110, a coordinate converter 170, and an overlay unit 180. The image sensor 190 includes an image processor (not shown) that performs basic image processing such as Bayer interpolation, YUV conversion, and sharpness processing, and sequentially outputs image data having been subjected to the image processing to the image processing device 100.

The dynamic range compressor 110 changes a characteristic of a tone curve depending on a position on input image data so as to compress a dynamic range of the image data. Specifically, the dynamic range compressor 110 compresses the dynamic range of the image data by changing a characteristic of a tone curve in such a manner that a dark position on the input image data turns into a bright position. The coordinate converter 170 converts the coordinates of the image data of which the dynamic range has been compressed by the dynamic range compressor 110 so as to perform distortion correction or viewpoint conversion on the image data. The overlay unit 180 superimposes, for example, characters or graphics on the image data of which the coordinates have been converted by the coordinate converter 170. The image data having characters, graphics, or the like superimposed by the overlay unit 180 is output externally from the image processing device 100. Here, the image data of which the coordinates have been converted by the coordinate converter 170 may be output externally from the image processing device 100 without being output to the overlay unit 180 superimposing characters, graphics, or the like. Image data output from the image processing device 100 may be encoded into an NTSC signal by an NTSC encoder (not shown).

Figure 2:
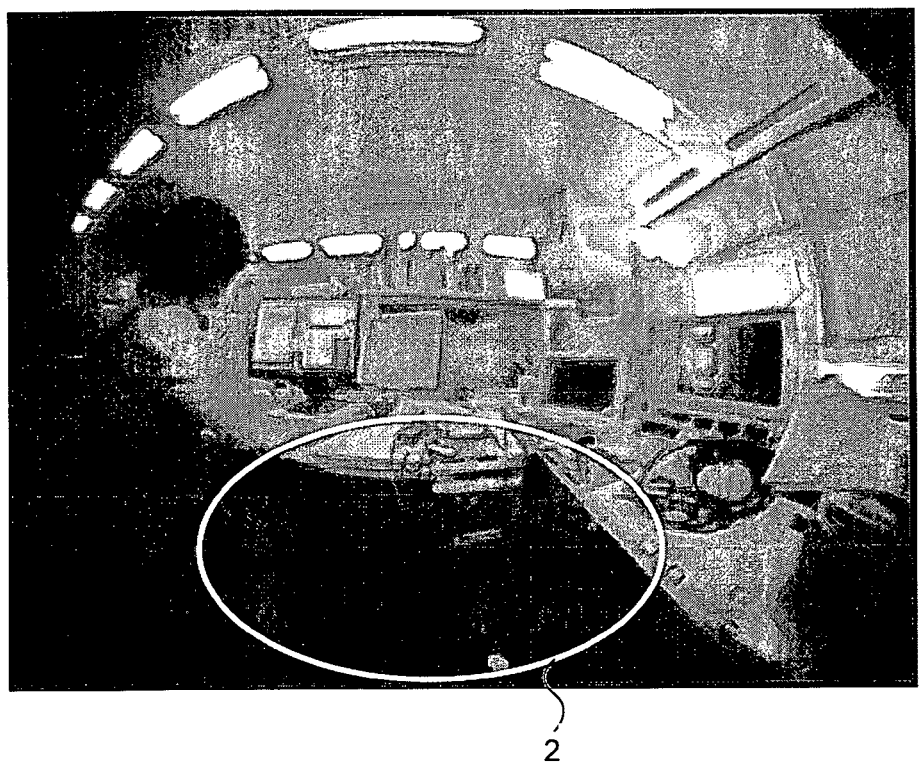
FIG. 2 illustrates exemplary image data output from an image sensor.

FIG. 2 illustrates exemplary image data output from the image sensor 190. The image data illustrated in FIG. 2 is obtained with the image sensor 190 receiving and converting a subject image entered through a fisheye lens having a wide view of angle and large distortion. In the image data, the lower area of the desk indicated in an ellipse 2 is underexposed.

Figure 3:
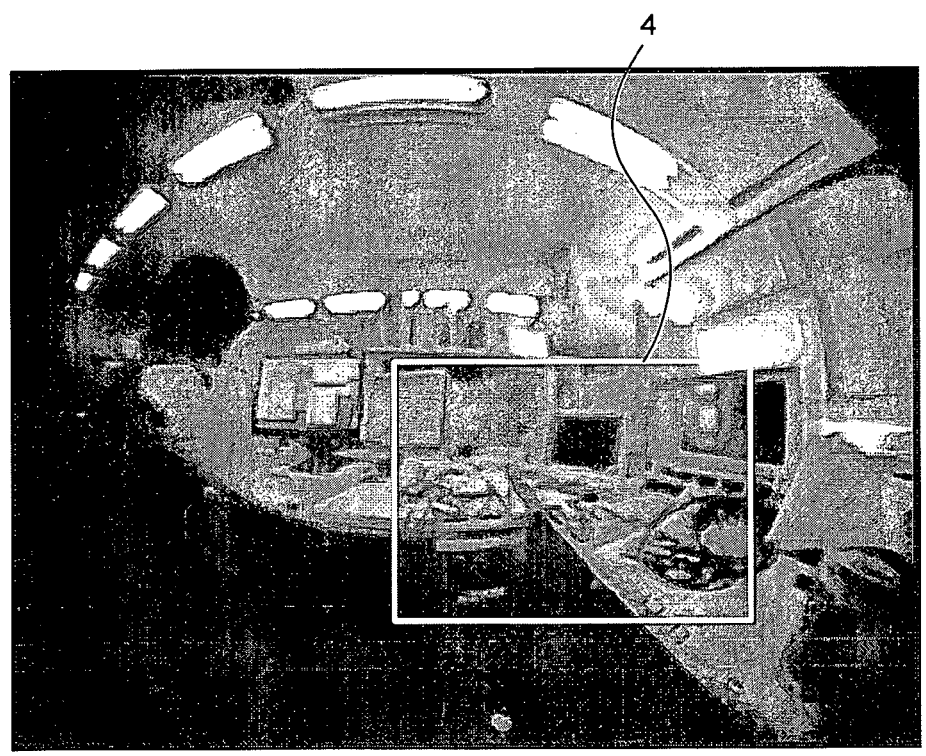
FIG. 3 illustrates exemplary image data obtained by compressing a dynamic range of the image data illustrated in FIG. 2.

FIG. 3 illustrates exemplary image data obtained with the dynamic range compressor 110 compressing the dynamic range of the image data illustrated in FIG. 2. In the image data illustrated in FIG. 3, the lower area that is underexposed of the desk in the image data of FIG. 2 turns into a brightly visible area because the image data has been subjected to dynamic range compression.

Figure 4:
FIG. 4 illustrates exemplary image data obtained by converting coordinates of the image data illustrated in FIG. 3.

FIG. 4 illustrates exemplary image data obtained with the coordinate converter 170 converting the coordinates of the image data illustrated in FIG. 3. The image data illustrated in FIG. 4 is obtained by enlarging the image data in a frame 4 of the image data illustrated in FIG. 3 to the same size (the same number of pixels) of the image data illustrated in FIG. 3. Likewise, as the image data illustrated in FIG. 3, the lower area that is underexposed of the desk turns into a brightly visible area. The image data illustrated in FIG. 4, thus, has high quality without an occurrence of ringing, artifacts, or the like.

Figure 5:
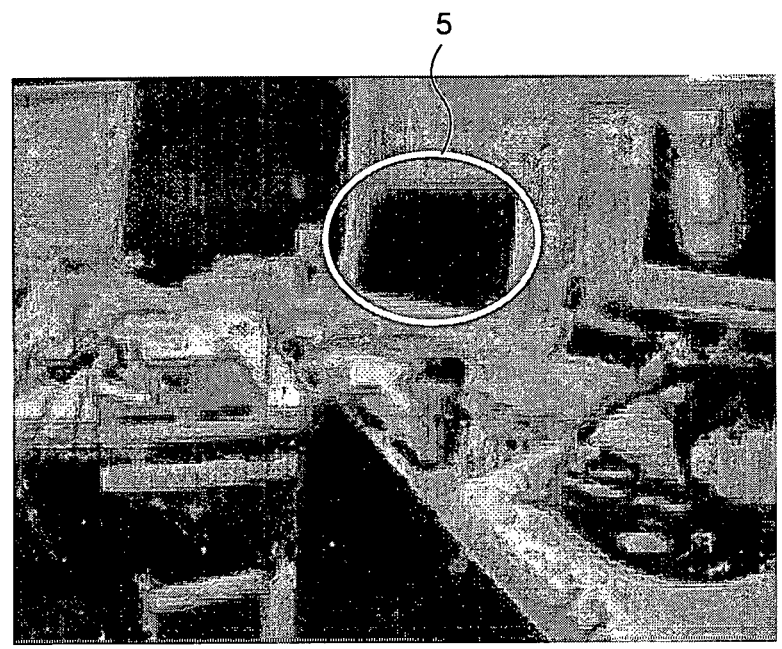
FIG. 5 illustrates exemplary image data obtained by converting the coordinates and thereafter compressing the dynamic range of the image data illustrated in FIG. 2.

As a comparative example, FIG. 5 illustrates exemplary image data obtained by converting the coordinates and thereafter compressing the dynamic range of the image data illustrated in FIG. 2. In the image data illustrated in FIG. 5, the lower area that is underexposed of the desk also turns into a brightly visible area. The example illustrated in FIG. 5, however, is affected by an image enlargement rate in dynamic range compression because the dynamic range is compressed after the coordinates of the image data are converted. As a result, artifacts occur in the display indicated in an ellipse 5, thereby lowering the image quality of the image data.

In the first embodiment, a dynamic range of image data can be compressed without being affected by an image enlargement rate because the dynamic range is compressed before the coordinates of the image data are converted as described above. Consequently, the present embodiment can turn a underexposed area into a brightly visible area and provide high quality images having no occurrence of ringing and artifacts, for example.

The detailed structure of the image processing device 100 of the first embodiment will be described below.

Figure 6:
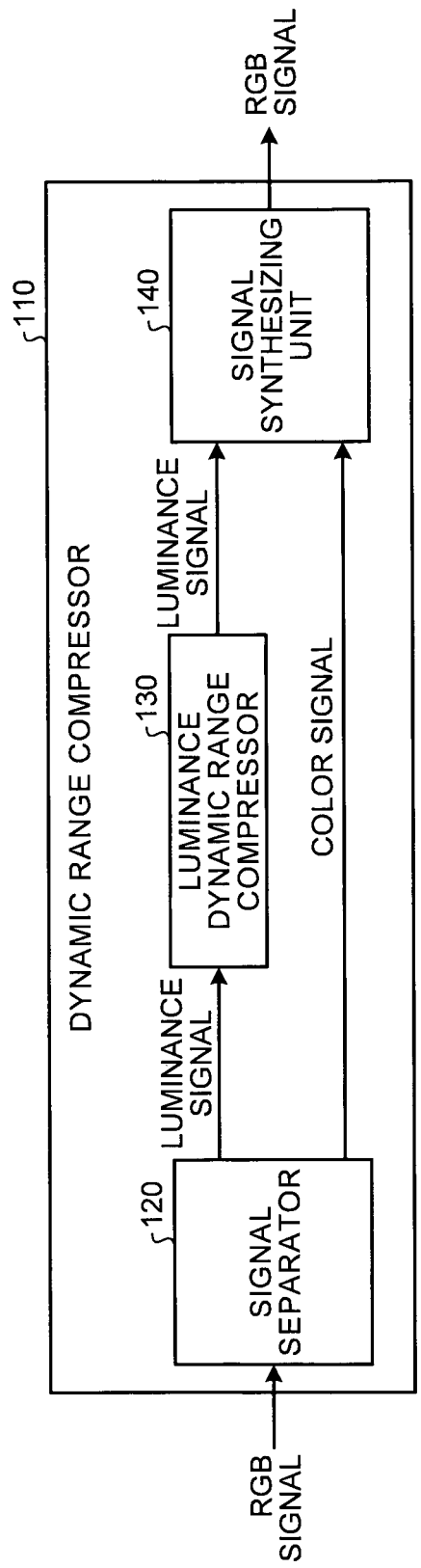
FIG. 6 is a block diagram illustrating an exemplary structure of a dynamic range compressor of the first embodiment.

FIG. 6 is a block diagram illustrating an exemplary structure of the dynamic range compressor 110 of the first embodiment. As illustrated in FIG. 6, the dynamic range compressor 110 includes a signal separator 120, a luminance dynamic range compressor 130, and a signal synthesizer 140.

The signal separator 120 separates an input RGB signal into: a luminance signal (hereinafter may be referred to as "luminance image data"); and a color signal. For example, the signal separator 120 separates an RGB signal into a luminance signal and a color signal by using formulas (1) to (3).

$$Y=0.299 \times R+0.587 \times G+0.114 \times B \quad (1)$$

$$Cr=0.500 \times R-0.419 \times G-0.081 \times B \quad (2)$$

$$Cb=-0.169 \times R-0.332 \times G+0.500 \times B \quad (3)$$

The luminance dynamic range compressor 130 compresses the dynamic range of the luminance signal separated by the signal separator 120. The detail of the luminance dynamic range compressor 130 will be described later.

The signal synthesizer 140 synthesizes the luminance signal of which the dynamic range has been compressed by the luminance dynamic range compressor 130 and the color signal separated by the signal separator 120 into an RGB signal. As a result, image data is produced of which the dynamic range has been compressed. For example, the signal synthesizer 140 synthesizes a luminance signal and a color signal into an RGB signal by using formulas (4) to (6).

$$R=Y+1.402 \times Cr \quad (4)$$

$$G=Y-0.714 \times Cr-0.344 \times Cb \quad (5)$$

$$B=Y+1.772 \times Cb \quad (6)$$

The detail of the luminance dynamic range compressor 130 is described herein. The luminance dynamic range compressor 130 compresses the dynamic range of image data by calculating an overall luminance change of the image data based on input luminance image data by utilizing a characteristic that human eyes are not sensitive to overall luminance changes in images, correcting the calculation result with a tone curve function, and multiplying the correction result by the input luminance image data. Here, the tone curve function is a nonlinear function and turns a position having a low luminance (dark) into a position having a high luminance (bright).

Figure 7:
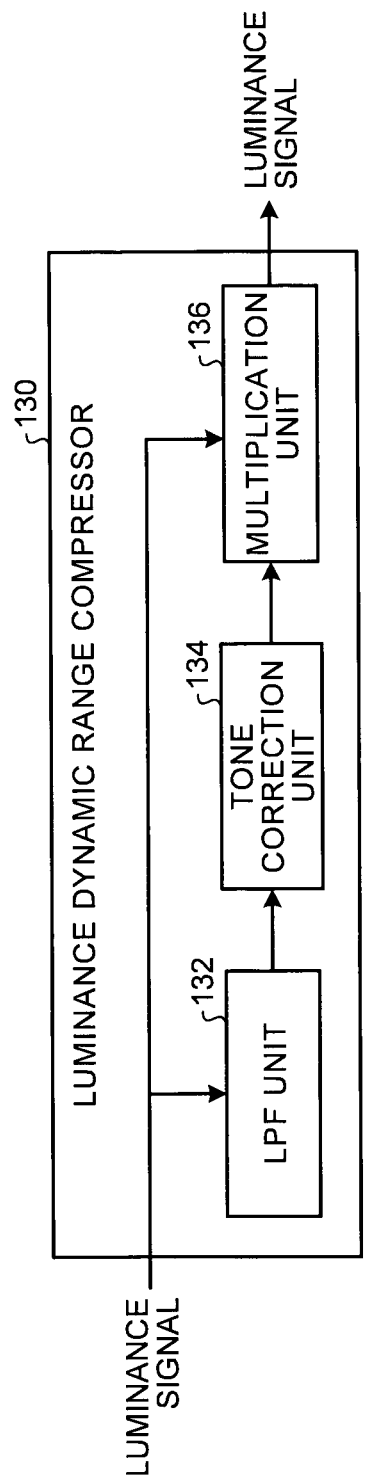
FIG. 7 is a block diagram illustrating an exemplary structure of a luminance dynamic range compressor of the first embodiment.

FIG. 7 is a block diagram illustrating an exemplary structure of the luminance dynamic range compressor 130 of the first embodiment. As illustrated in FIG. 7, the luminance dynamic range compressor 130 includes a low pass filter (LPF) unit 132, a tone correction unit 134, and a multiplication unit 136.

The LPF unit 132 obtains an overall luminance change of image data by extracting a frequency lower than a cutoff frequency in a space frequency of input luminance image data. If the cutoff frequency of the LPF unit 132 is too low, the effect of dynamic range compression remains low, while if too high, ringing or artifacts occurs in image data of which the dynamic range has been compressed. The cutoff frequency, thus, needs to be adjusted to an appropriate value. The cutoff frequency of the LPF unit 132 can be adjusted with the number of meshes (the number of divisions) of luminance image data. The larger the number of meshes, the higher the cutoff frequency, whiles the smaller the number of meshes, the lower the cutoff frequency.

Figure 8:
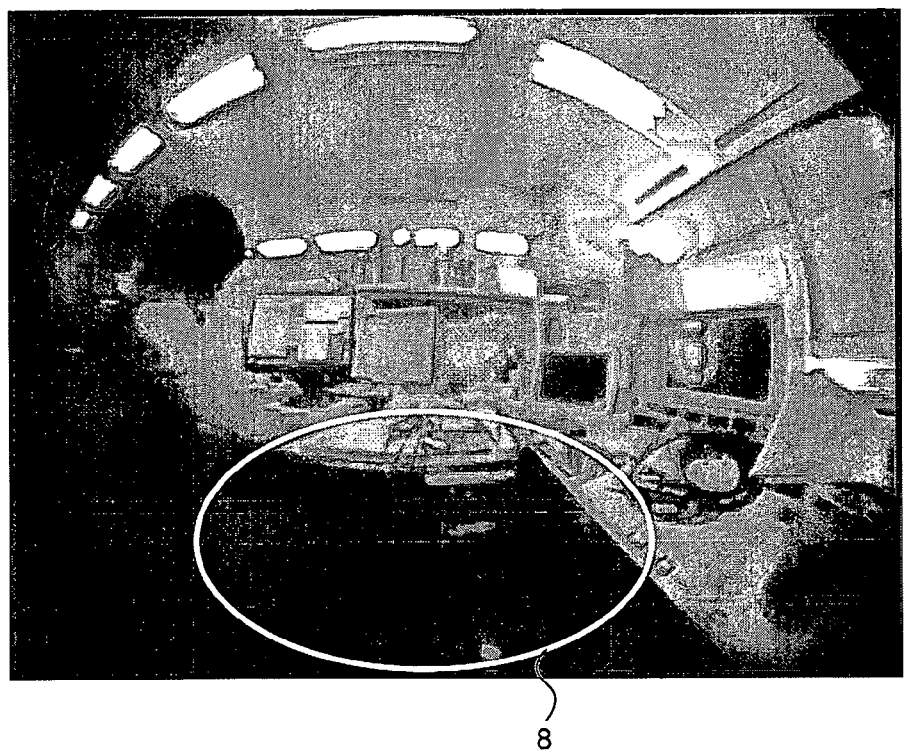
FIG. 8 illustrates exemplary image data obtained by compressing the dynamic range of the image data illustrated in FIG. 2 with 2×2 meshes.

FIG. 8 illustrates exemplary image data obtained by dividing the image data illustrated in FIG. 2 into 2×2 meshes and compressing the dynamic range of the image data with the luminance dynamic range compressor 130. In the image data illustrated in FIG. 8, the lower area that is underexposed of the desk indicated in an ellipse 8 is not truly reformed because a too low cutoff frequency of the LPF unit 132 causes the dynamic range compression effect to be lowered.

Figure 9:
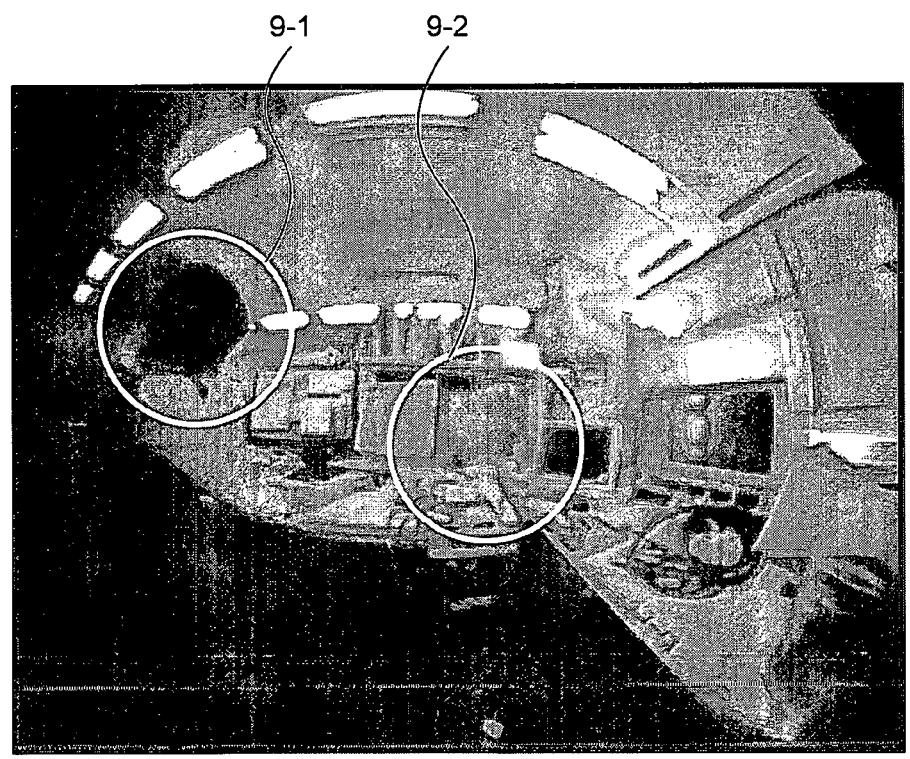
FIG. 9 illustrates exemplary image data obtained by compressing the dynamic range of the image data illustrated in FIG. 2 with 16×16 meshes.

FIG. 9 illustrates exemplary image data obtained by dividing the image data illustrated in FIG. 2 into 16×16 meshes and compressing the dynamic range of the image data with the luminance dynamic range compressor 130. In the image data illustrated in FIG. 9, the cutoff frequency of the LPF unit 132 is too high. Consequently, artifacts occur in the back of the head of the person indicated in a circle 9-1 and the space indicated in a circle 9-2, and ringing occurs around the outline while the lower area that is underexposed of the desk turns into a brightly visible area.

Figure 10:
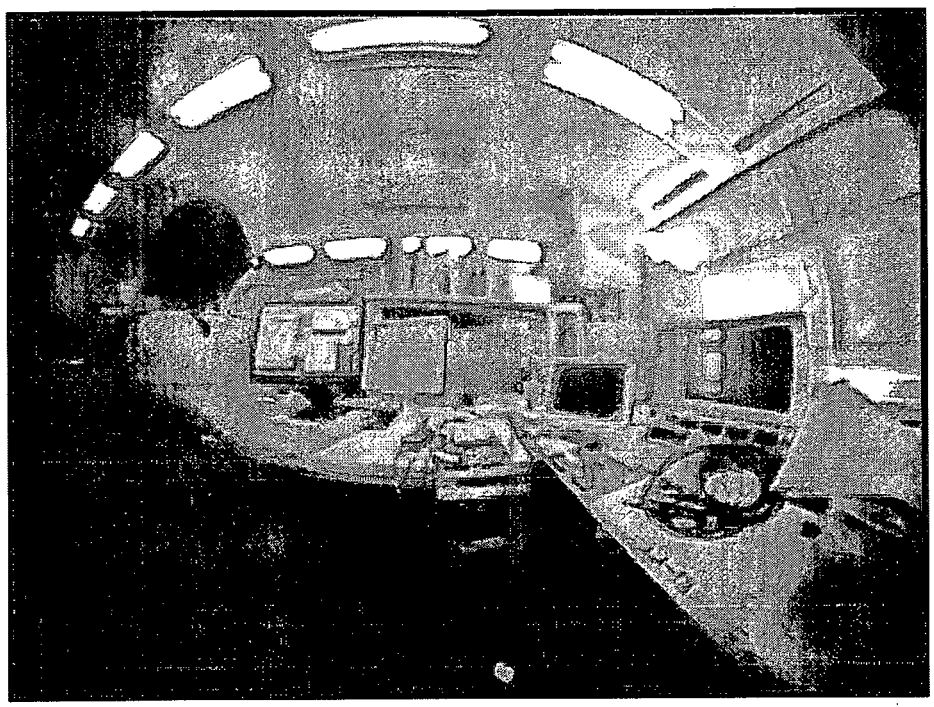
FIG. 10 illustrates exemplary image data obtained by compressing the dynamic range of the image data illustrated in FIG. 2 with 8×8 meshes.

FIG. 10 illustrates exemplary image data obtained by dividing the image data illustrated in FIG. 2 into 8×8 meshes and compressing the dynamic range of the image data with the luminance dynamic range compressor 130. In the image data illustrated in FIG. 10, the lower area that is underexposed of the desk turns into a brightly visible area, and no artifacts and ringing occur.

In the first embodiment, as described above, a value of the cutoff frequency of the LPF unit 132 is preferably set to a space frequency when luminance image data is divided into more than 2×2 meshes and less than 16×16 meshes, and more preferably 8×8 meshes. The following description is made based on an example in which the value of the cutoff frequency of the LPF unit 132 is a space frequency when luminance image data is divided into 8×8 meshes. In a case of 8×8 meshes, each mesh size is ⅛×⅛ of the size of luminance image data.

Figure 11:
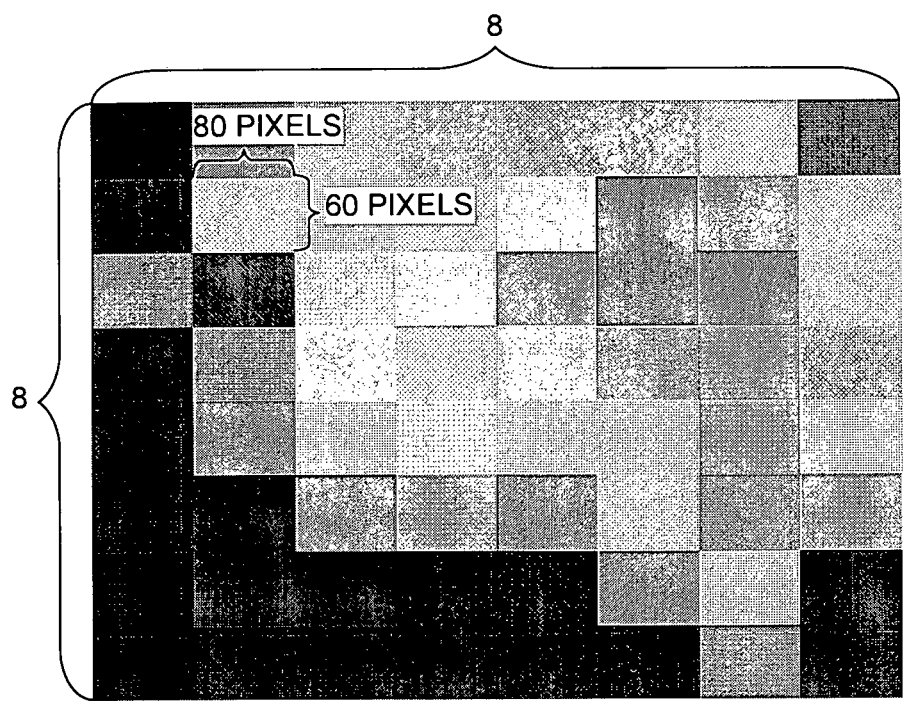
FIG. 11 illustrates exemplary luminance image data divided into 8×8 meshes.

Referring back to FIG. 7, the LPF unit 132 specifically divides input luminance image data into 8×8 meshes (refer to FIG. 11), calculates the sum of luminance mesh by mesh, and setting the calculated luminance sum as vertex data to prepare reduced image data of 7×7 meshes. The LPF unit 132 enlarges the prepared reduced image data to the same size (the same number of pixels) as the luminance image data by linearly interpolating their midpoints of the meshes of the reduced image data (refer to FIG. 12), and outputs luminance image data showing an overall luminance change of the image data.

Figure 13:
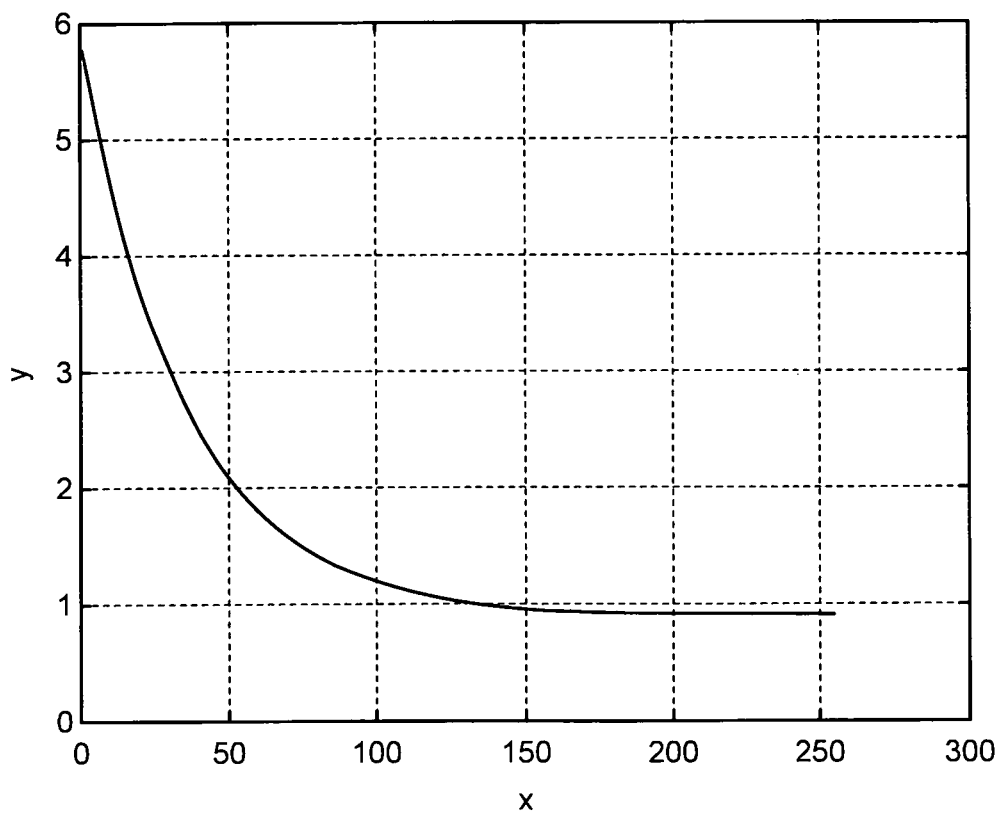
FIG. 13 is a graph illustrating an example of a tone curve function.

By using a tone curve function, the tone correction unit 134 corrects the overall luminance change of the image data, the change being obtained by the LPF unit 132. An example of the tone curve function is represented by formula (7).

$$y=A/\exp(x/B)+C \quad (7)$$

where y is the corrected luminance image data (an amplification factor of luminance) showing a luminance change after correction, x is the luminance image data input to the tone correction unit 134, and A, B, and C are constants. The constants A, B, and C can be adjusted according to an dynamic range of image data input to the image processing device 100 or the requirements of an image capturing device such as the image sensor 190. For example, where A=5, B=35, and C=0.9, the tone curve function represented by formula (7) becomes a tone curve function that is represented by formula (8) and illustrated in the graph of FIG. 13.

$$y=5/\exp(x/35)+0.9 \quad (8)$$

Figure 12:
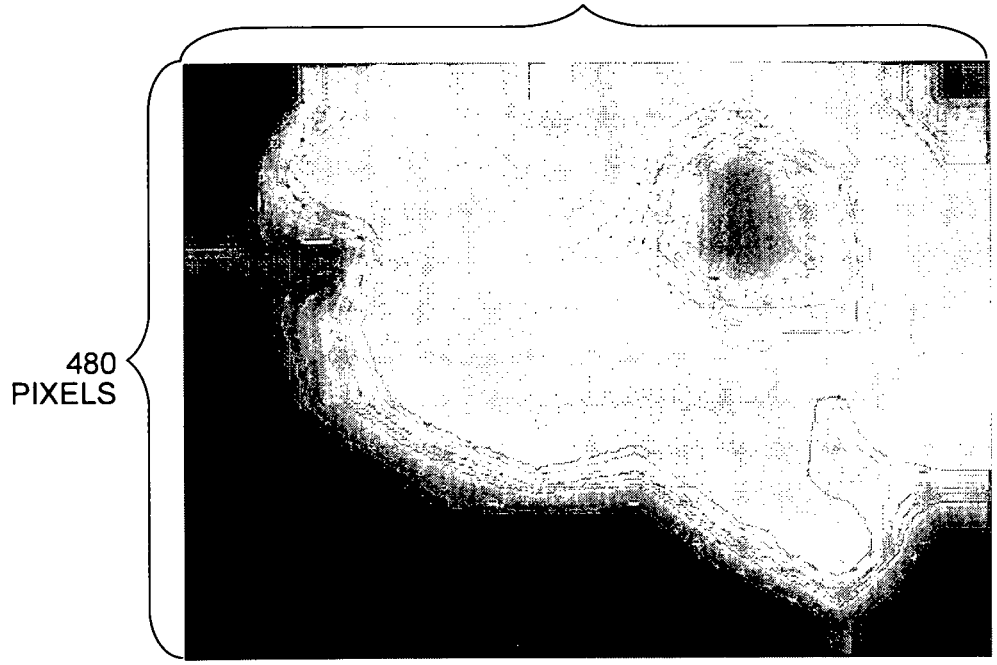
FIG. 12 illustrates exemplary luminance image data output from an LPF unit 132 of the first embodiment.
Figure 14:
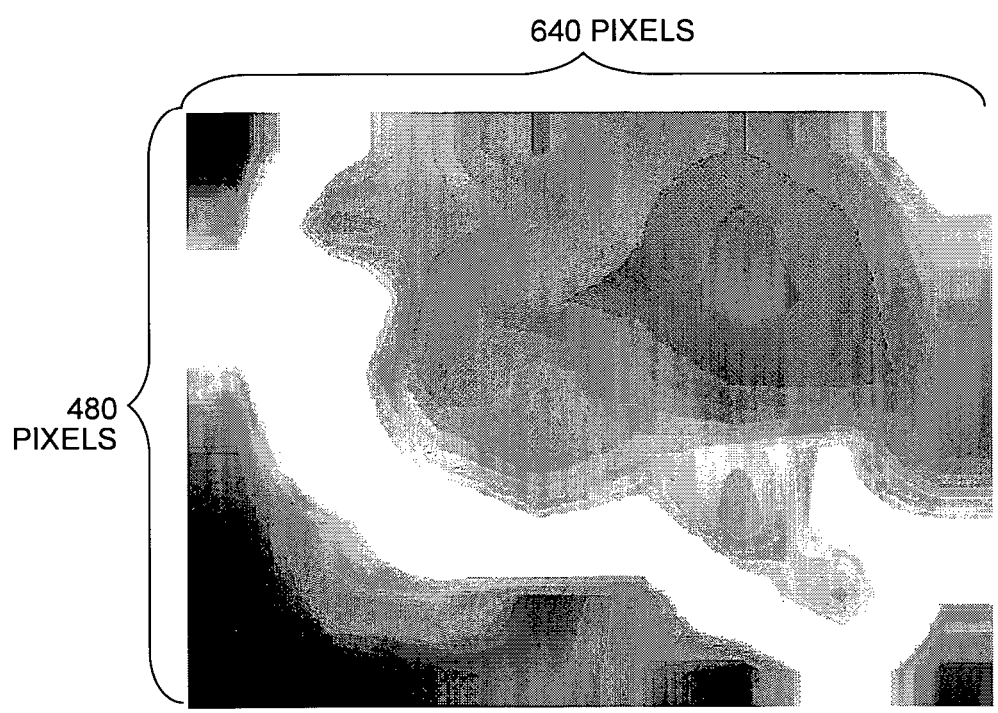
FIG. 14 illustrates exemplary luminance image data obtained by correcting an overall luminance change of the luminance image data illustrated in FIG. 12.

For example, the tone correction unit 134 corrects an overall luminance change of the luminance image data illustrated in FIG. 12 by using the tone curve function represented by formula (8) (refer to FIG. 14).

However, the tone curve function represented by formula (8) causes an amplification factor of luminance to become too large (a maximum is too large) or a reduction factor of luminance to become too large (a minimum is too small), resulting in ringing and artifacts to likely occur.

Figure 15:
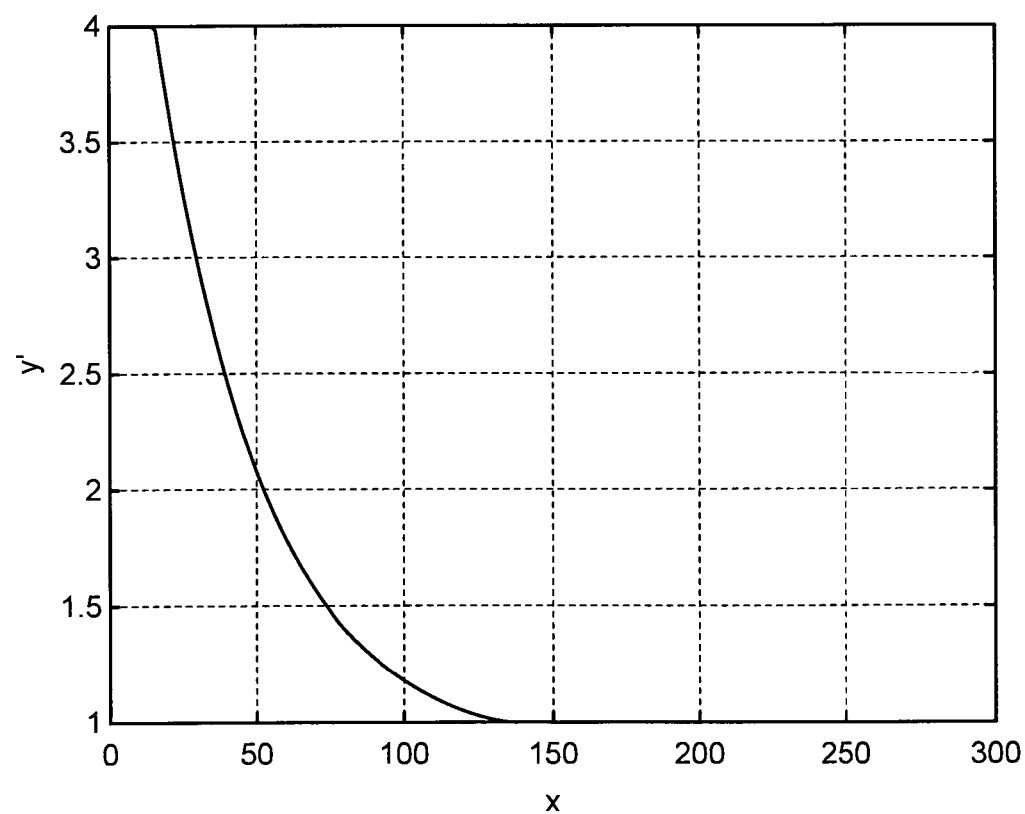
FIG. 15 is a graph illustrating an example of a tone curve function obtained by correcting the tone curve function illustrated in FIG. 13.

In order to eliminate them, the tone correction unit 134 further corrects a value of y, which becomes y' after correction. Specifically, if the value of y is one or less (y≤1), the value of y' is 1 (y'=1) as a result of correction. If the value of y is larger than one (y>1), the value of y' is y (y'=y) as a result of correction. If the value of y is larger than D (y>D), the value of y' is D (y'=D) as a result of correction. Here, D is a constant. For example, where D=4, the tone curve function represented by formula (8) becomes a function illustrated in the graph of FIG. 15.

The tone curve functions described above have exponential terms, so that a certain size of a circuit is required to carry out real-time calculation. In order to avoid such requirement, no calculation may be required by storing a calculation result in a memory (not shown) as a table in advance or calculation may be carried out by using polynomials approximating the tone curve functions.

The multiplication unit 136 multiplies corrected luminance image data that is a correction result of the tone correction unit 134 by luminance image data input to the luminance dynamic range compressor 130 so as to produce multiplied luminance image data, and outputs the resulting data. The multiplication unit 136 can be realized with multipliers, for example.

Figure 16:
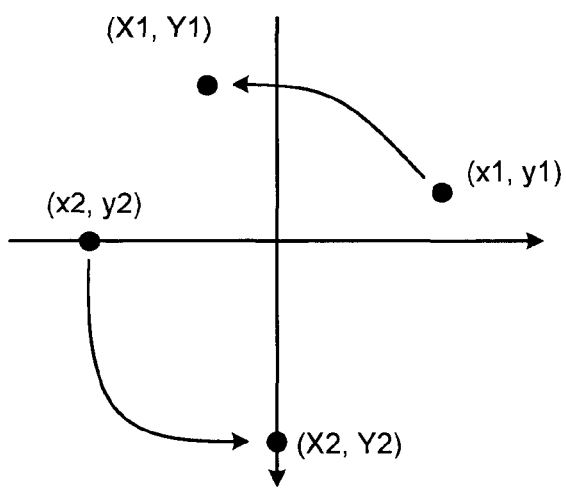
FIG. 16 is an explanatory view illustrating an exemplary coordinate conversion technique.
Figure 17:
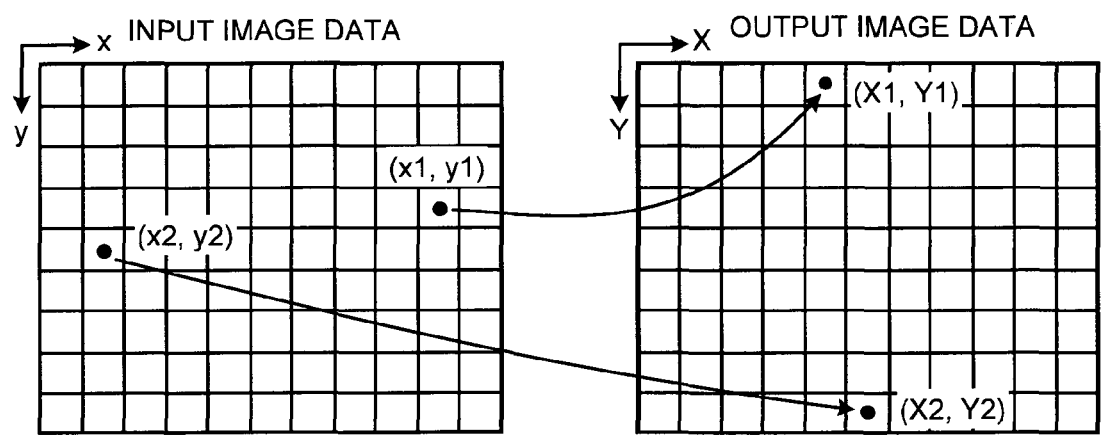
FIG. 17 is an explanatory view illustrating the exemplary coordinate conversion technique.

Referring back to FIG. 1, the coordinate converter 170 converts the coordinates of image data by outputting pixel data of input image data input from the dynamic range compressor 110 as output image data in an order different from the order of the pixel data of the input image data so as to deform an image. For example, as illustrated in FIG. 16, the coordinates (x1, y1) of first pixel data are converted into the coordinates (X1, Y1) while the coordinates (x2, y2) of second pixel data are converted into the coordinates (X2, Y2). In this case, as illustrated in FIG. 17, the coordinate converter 170 outputs the first pixel data input as the pixel data having the coordinates (x1, y1) as the pixel data having the coordinates (X1, Y1) while outputs the second pixel data input as the pixel data having the coordinates (x2, y2) as the pixel data having the coordinates (X2, Y2). The coordinate converter 170 includes a frame buffer 172, a coordinate calculator 174, and an image extender 176 as illustrated in FIG. 1.

The frame buffer 172 stores therein input image data for one or more shots of pictures (in the first embodiment, input image data for two shots of pictures) input from the dynamic range compressor 110, and may be realized with existing memories such as dynamic random access memories (DRAMs). Examples of input image data input to the frame buffer 172 include YUV422 format data (8 bits), which is input in the following order: Y, U, Y, V, Y, U, Y, V, . . . . Effective image data size is 640×480. The frame rate is 30 fps. The frame buffer 172 can also store therein data of 1 M×16 bits. The frame buffer 172 stores therein a luminance signal (8 bits) and a color-difference signal (8 bits) into each address in a state that the luminance signal is stored in the upper 8 bits while the color-difference signal is stored in the lower 8 bits. Data is written in and read out from the frame buffer 172 by a double buffer method. The write-in process is based on progressive scanning while the read-out process is based on interlace scanning taking into consideration of an NTSC output. The frame rate of the both is 30 fps.

The coordinate calculator 174 calculates coordinates of input image data, the coordinates corresponding to each pixel of output image data output from the frame buffer 172, and reads out the output image data from the frame buffer 172 based on the calculation result: thus deformation of an image is realized. The coordinate converter 170 includes a non-illustrated flash memory that stores therein coordinate data (a conversion table) including coordinates of the input image data, the coordinates being calculated in advance and corresponding to a sampling pixel of the output image data. The coordinate calculator 174 calculates coordinates of input image data, the coordinates corresponding to each pixel of output image data, by bilinear interpolation with reference to the conversion table, etc. The coordinate calculator 174 converts the calculated coordinates of the input image data into an address, and reads out the output image data from an address of the frame buffer 172, the address corresponding to the converted address. The number of read out pixels in a main-scanning direction, the pixels being output from the frame buffer 172, is smaller than the number of pixels in an output picture plane.

Figure 18:
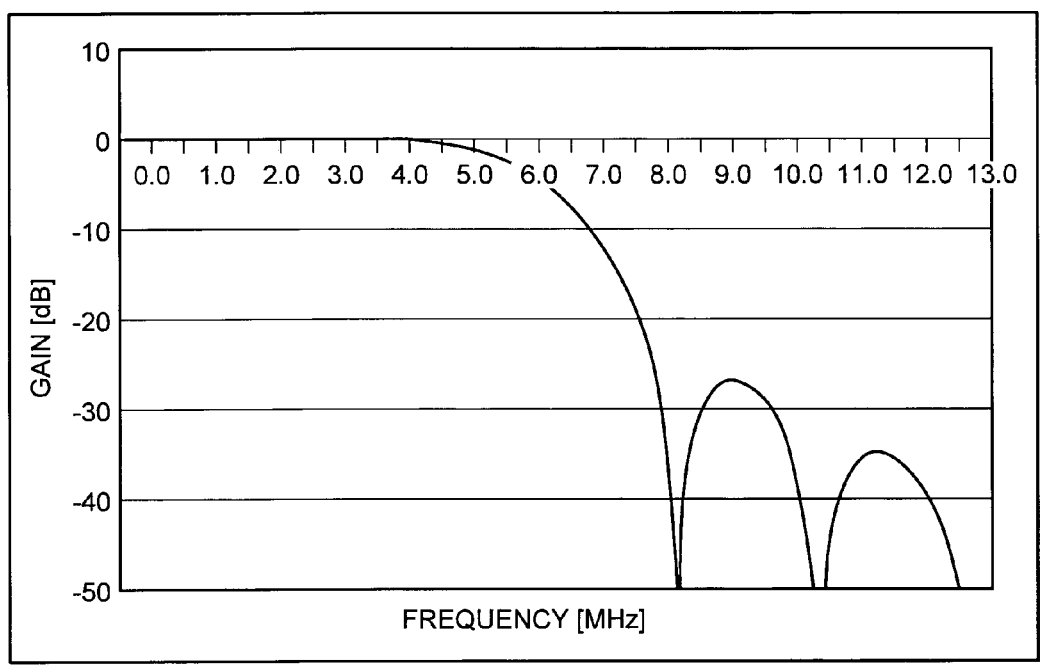
FIG. 18 is an explanatory view illustrating an exemplary image extension technique.

The image extender 176 extends the output image data read out from the frame buffer 172 to the necessary numbers of pixels for eventually being output in a picture plane main-scanning direction, and outputs the extended result. The frame buffer 172 causes large latency in random access. The read-out resolution of one horizontal line in an image is, thus, limited to 500 pixels from a read-out speed point of view. However, the resolution of one horizontal line required for outputting an NTSC signal is 720 pixels. The image extender 176, thus, extends image data that is read out from the frame buffer 172 and has 500 pixels per line to image data having 720 pixels per line in the picture plane main-scanning direction. Here, the horizontal resolution of an output NTSC signal is 8.0 MHz/30 fps/525 lines=507. In other words, even when image data having 720 pixels per line is read out, since the output to the NTSC is limited, the image data having 500 pixels per line hardly deteriorates in quality (refer to FIG. 18).

Figure 19:
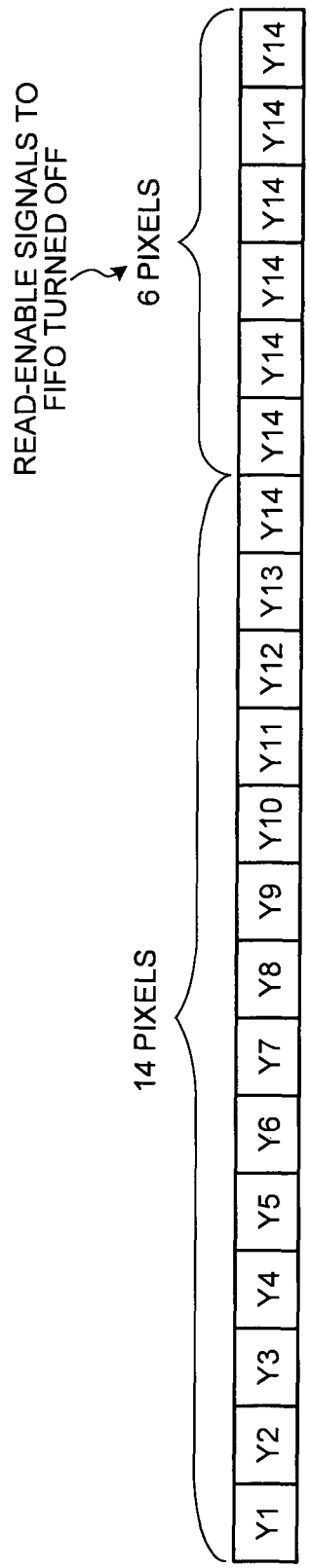
FIG. 19 is an explanatory view illustrating the exemplary image extension technique.
Figure 20:
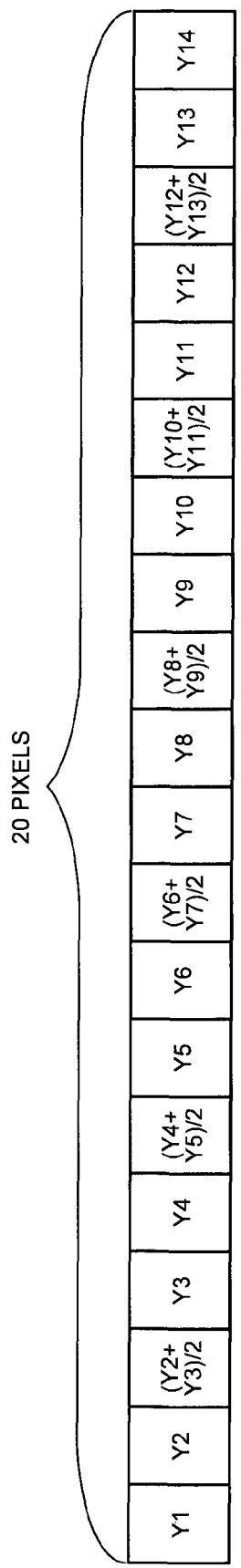
FIG. 20 is an explanatory view illustrating the exemplary image extension technique.

Specifically, output image data having 500 pixels per line read out from the frame buffer 172 by the coordinate calculator 174 is written in a first-in first-out (FIFO). The output image data having 500 pixels per line is read out from the FIFO with read-enable signals in the following manner: one set of the read-enable signal for reading out data from the FIFO is composed of HIGH in 14 clocks and LOW in 6 clocks (refer to FIG. 19) and the set is repeated 35 times, but last one set is composed of HIGH in 10 clocks and LOW in 10 clocks. The image extender 176 extends the read out output image data as illustrated in FIG. 20.

Next, an operation of the image processing device 100 of the first embodiment will be described.

Figure 21:
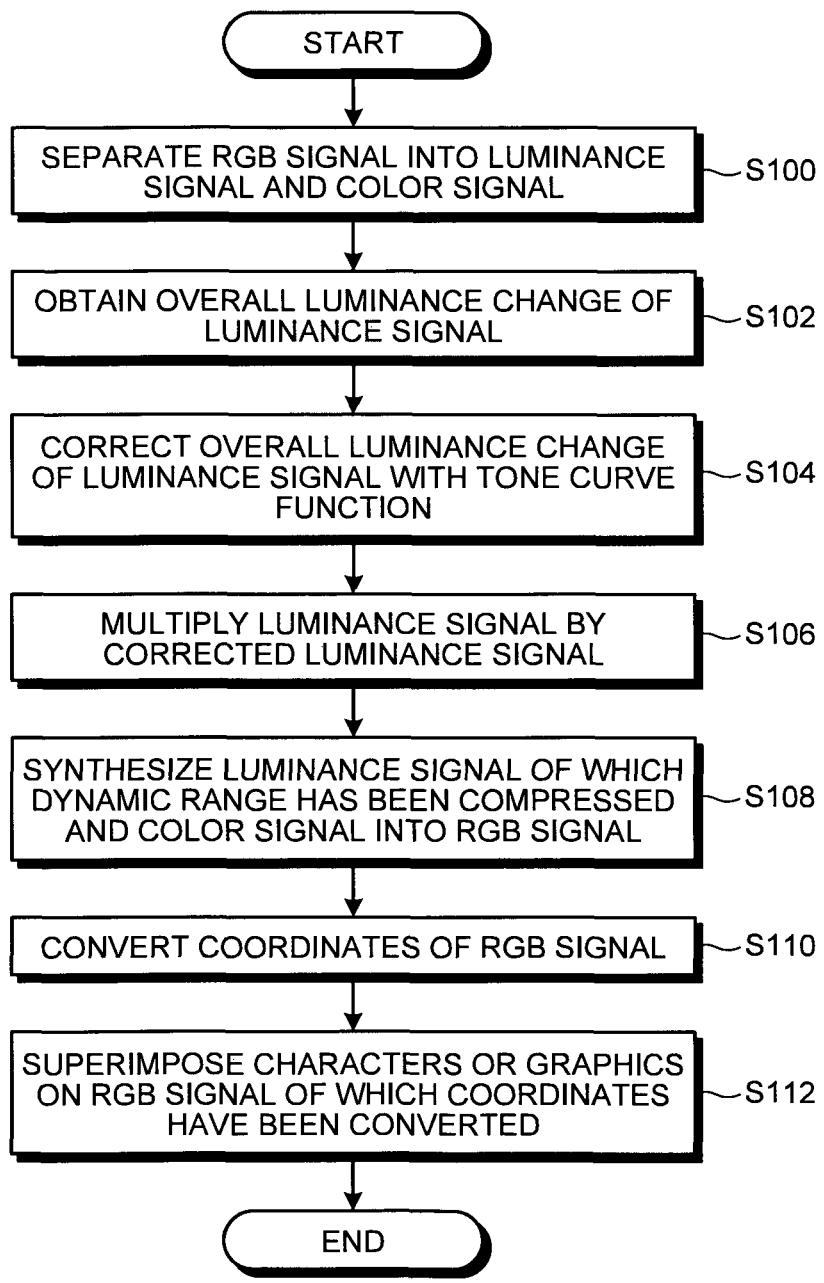
FIG. 21 is a flowchart illustrating an example of image processing of the image processing device of the first embodiment.

FIG. 21 is the flowchart illustrating an exemplary flow of image processing procedures carried out in the image processing device 100 of the first embodiment.

First, the signal separator 120 separates an RGB signal input to the image processing device 100 into a luminance signal and a color signal (step S100).

Then, the LPF unit 132 extracts a frequency lower than a cutoff frequency in a space frequency of the luminance signal input to the LPF unit 132 so as to obtain an overall luminance change of the luminance signal (step S102). Next, the tone correction unit 134 corrects the overall luminance change of the luminance signal, the overall luminance change being obtained by the LPF unit 132, by using a tone curve function (step S104). Then, the multiplication unit 136 multiplies the luminance signal corrected in the tone correction unit 134 by the luminance signal input to the luminance dynamic range compressor 130 (step S106). The dynamic range of the luminance signal is compressed through processes from step S102 to step S106.

Next, the signal synthesizer 140 synthesizes the luminance signal of which the dynamic range has been compressed and the color signal separated by the signal separator 120 into an RGB signal (step S108).

Subsequently, the coordinate converter 170 converts the coordinates of the RGB signal synthesized by the signal synthesizer 140 (step S110).

Next, the overlay unit 180 superimposes, for example, characters or graphics on the RGB signal of which the coordinates have been converted by the coordinate converter 170, and outputs the resulting signal from the image processing device 100 (step S112).

In the first embodiment, as described above, a dynamic range is compressed before the coordinates of image data are converted. Accordingly, the first embodiment is free from the effect of an image enlargement rate due to coordinate conversion, and a dynamic range can be compressed by accurately estimating light source conditions (an overall luminance change of image data) with the LPF unit 132 having a normalized cutoff frequency with respect to the size of image data output from the image sensor 190. Consequently, the first embodiment can turn a underexposed area into a brightly visible area and provide high quality images having no occurrence of ringing and artifacts.

The first embodiment can also reduce the circuit size because it is not necessary to change the cutoff frequency of the LPF unit 132 corresponding to image data to be subjected to dynamic range compression.

Second Embodiment

In a second embodiment, an example is described in which a separated color signal is amplified. In the following descriptions, differences from the first embodiment will be mainly described. Constituents having identical functions to those in the first embodiment are denoted with like name and reference numerals, and descriptions thereof will be omitted.

Figure 22:
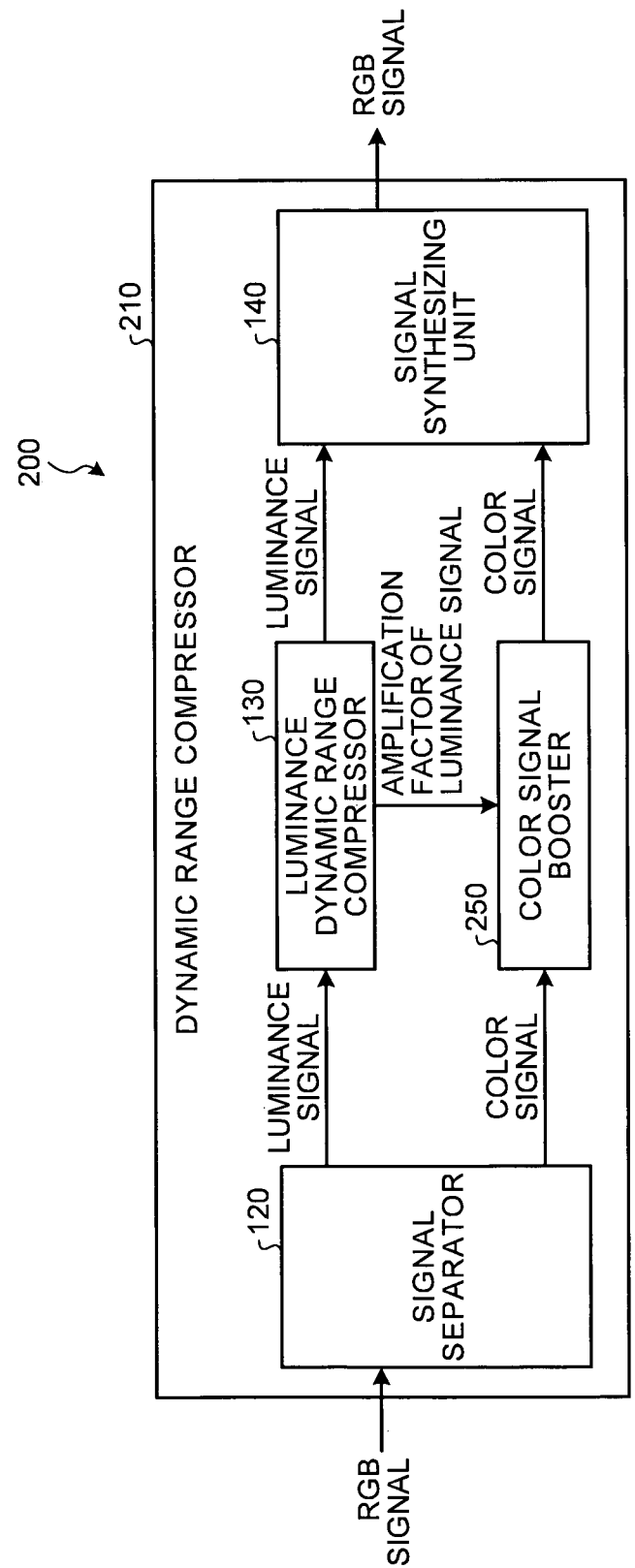
FIG. 22 is a block diagram illustrating an exemplary structure of a dynamic range compressor of a second embodiment.

FIG. 22 is a block diagram illustrating an exemplary structure of a dynamic range compressor 210 of the second embodiment. The dynamic range compressor 210 of an image processing device 200 of the second embodiment differs from the dynamic range compressor 110 of the first embodiment in that a color signal booster 250 is added. The color signal booster 250 will be described below.

The color signal booster 250 amplifies a color signal separated by the signal separator 120 according to an amplification factor (an amplification factor of a luminance represented by a correction result of the tone correction unit 134) of a luminance signal amplified by the luminance dynamic range compressor 130. For example, the color signal booster 250 amplifies color signals (Cr and Cb) by using formulas (9) and (10).

$$Cr = ((y-1) \times Q + 1) \times Cr \quad (9)$$

$$Cb = ((y-1) \times Q + 1) \times Cb \quad (10)$$

where y is the amplification factor of the luminance signal and Q is a constant. The larger a value of Q becomes, the higher a color signal is amplified.

Figure 23:
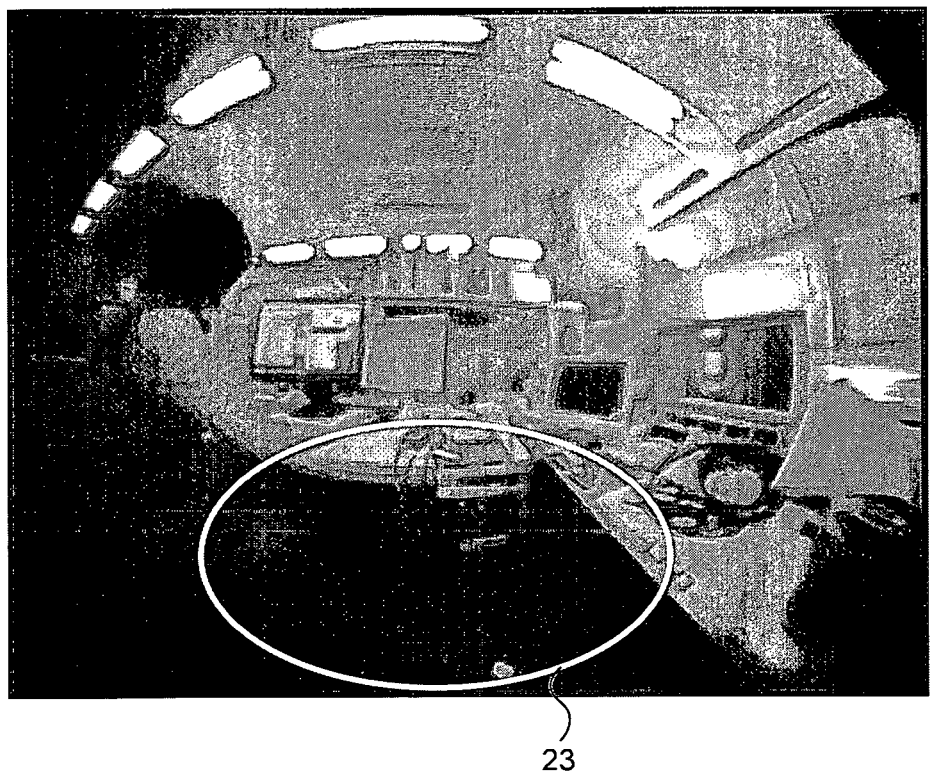
FIG. 23 illustrates exemplary image data obtained by compressing the dynamic range and amplifying the color signal of the image data illustrated in FIG. 2.
Figure 24:
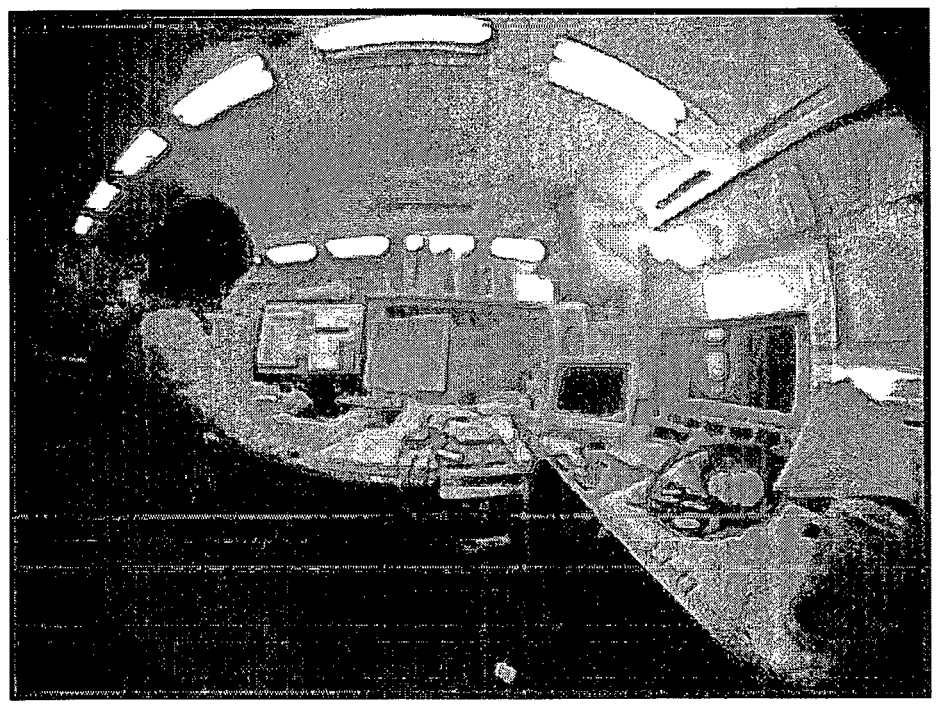
FIG. 24 illustrates exemplary image data obtained by only compressing the dynamic range of the image data illustrated in FIG. 2.

FIG. 23 illustrates exemplary image data obtained by compressing the dynamic range and amplifying the color signal of the image data illustrated in FIG. 2. As a comparative example, FIG. 24 illustrates exemplary image data obtained by only compressing (without amplifying the color signal) the dynamic range of the image data illustrated in FIG. 2. In the example illustrated in FIG. 23, the color signal is amplified by setting a value of the constant Q to 0.5. In the image data illustrated in FIG. 23, the color of the lower area of the desk indicated in an ellipse 23 more clearly appears than the image data illustrated in FIG. 24.

Next, an operation of the image processing device 200 of the second embodiment will be described.

Figure 25:
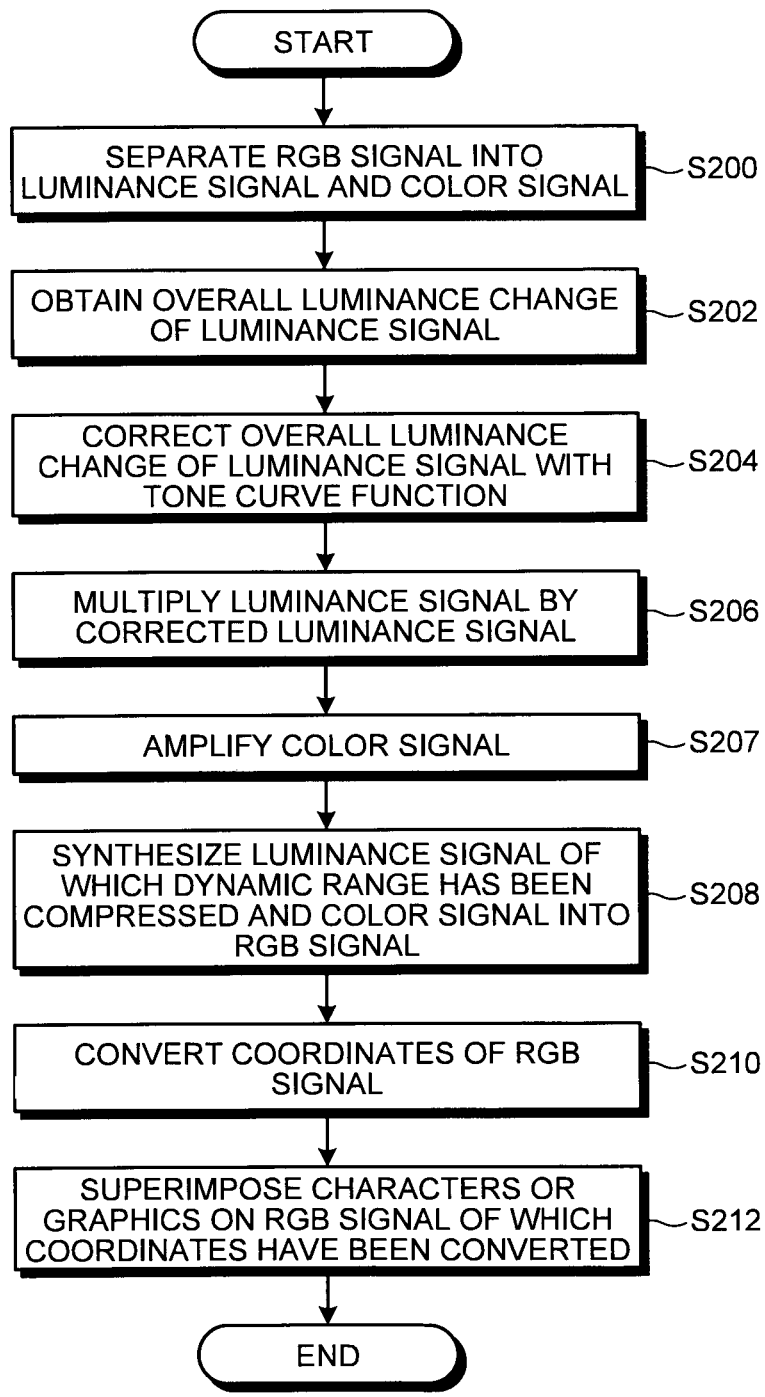
FIG. 25 is a flowchart illustrating an example of image processing carried out by an image processing device of the second embodiment.

FIG. 25 is the flowchart illustrating an exemplary flow of image processing procedures carried out in the image processing device 200 of the second embodiment.

The processes of step S200 to step S206 are the same as those of step S100 to step S106 of the flowchart illustrated in FIG. 21, and the descriptions thereof are omitted.

Subsequently, the color signal booster 250 amplifies the color signal separated by the signal separator 120 according to an amplification factor of the luminance signal amplified by the luminance dynamic range compressor 130 (step S207).

The processes of step S208 to step S212 are the same as those of step S108 to step S112 of the flowchart illustrated in FIG. 21, and the descriptions thereof are omitted.

In the second embodiment, as described above, even image data of which the dynamic range has been compressed can clearly show color variations because a color signal is amplified according to an amplification factor of luminance signal. As a result, good color repeatability can be obtained.

Third Embodiment

In a third embodiment, an example, in which noises are removed from an amplified luminance signal, will be described. In the following descriptions, differences from the first embodiment will be mainly described. The same name and reference numeral of the first embodiment are given to an element having the same function of the first embodiment, and description thereof is omitted.

Figure 26:
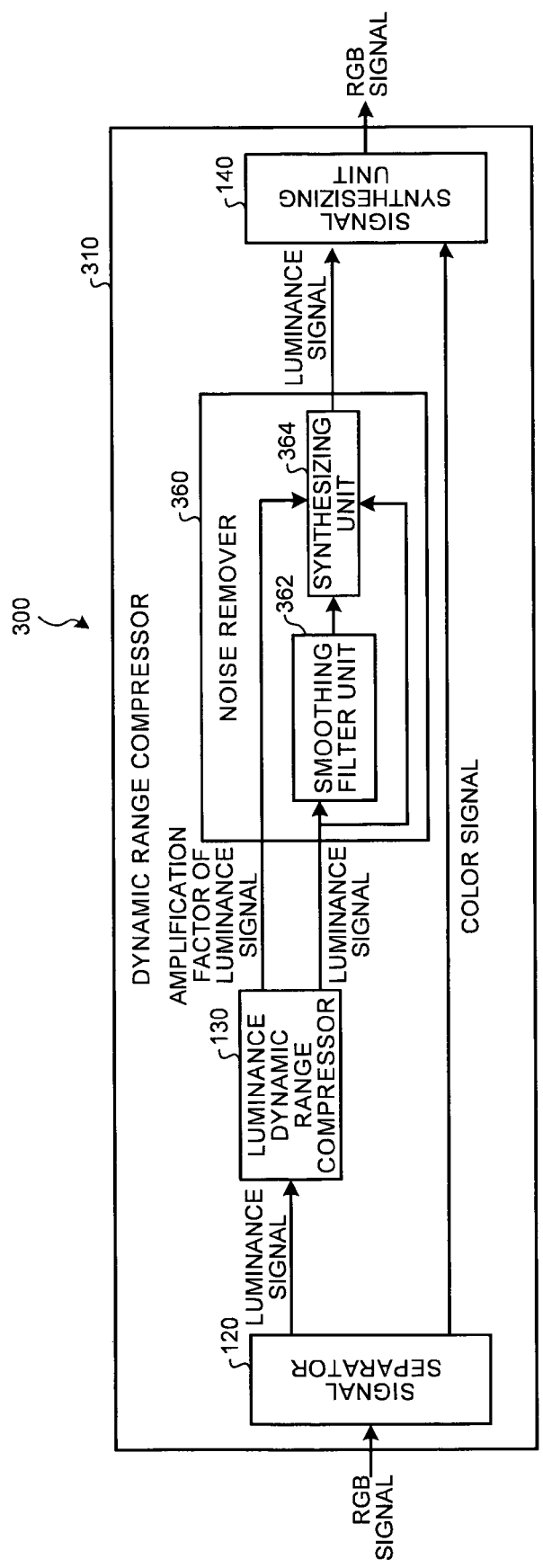
FIG. 26 is a block diagram illustrating an exemplary structure of a dynamic range compressor of a third embodiment.

FIG. 26 is a block diagram illustrating an exemplary structure of a dynamic range compressor 310 of the third embodiment. The dynamic range compressor 310 of an image processing device 300 of the third embodiment differs from the dynamic range compressor 110 of the first embodiment in that a noise remover 360 is added. The noise remover 360 is described below.

The noise remover 360 removes noises from a luminance signal amplified by the luminance dynamic range compressor 130 with intensity according to an amplification factor (an amplification factor of a luminance represented by a correction result of the tone correction unit 134) of a luminance signal amplified by the luminance dynamic range compressor 130. The noise remover 360 includes a smoothing filter unit 362 and a synthesizer 364.

The smoothing filter unit 362 removes noises from a luminance signal amplified by the luminance dynamic range compressor 130, and can be realized with, for example, a 3×3 weighted average FIR filter, a median filter, or an epsilon filter. After the noise removal, a slightly blurred luminance image is produced.

The synthesizer 364 adds the luminance signal amplified by the luminance dynamic range compressor 130 and the luminance signal from which noises have been removed by the smoothing filter unit 362 so as to synthesize the signals according to an amplification factor of the luminance signal amplified by the luminance dynamic range compressor 130. As a result, only an area in which luminance has been amplified is smoothed while other areas keep their sharpness. For example, the synthesizer 364 synthesizes luminance signals by using formula (11).

$$Y\text{output} = Y\text{noisefil} \times (y-1) + Y \times (2-y) \quad (11)$$

where Youtput is the luminance signal after synthesizing, Ynoisefil is the luminance signal from which noises have been removed by the smoothing filter unit 362, y is the an amplification factor and limited in a range of 2<y<1, and Y is the luminance signal amplified by the luminance dynamic range compressor 130.

Figure 27:
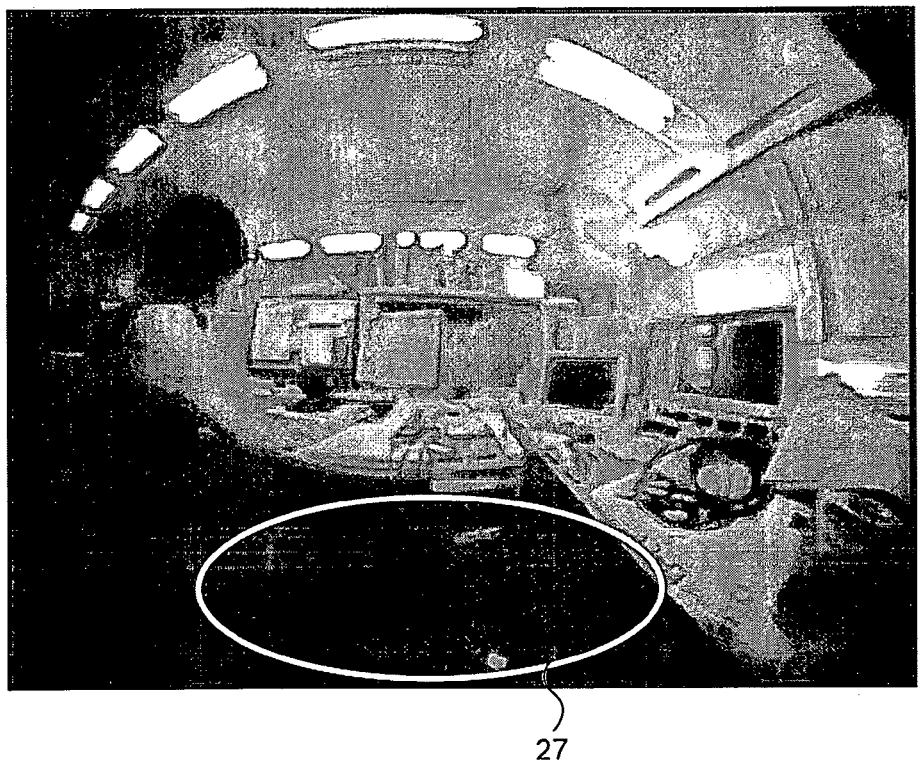
FIG. 27 illustrates exemplary image data obtained by compressing the dynamic range and removing noises from the luminance signal of the image data illustrated in FIG. 2.
Figure 28:
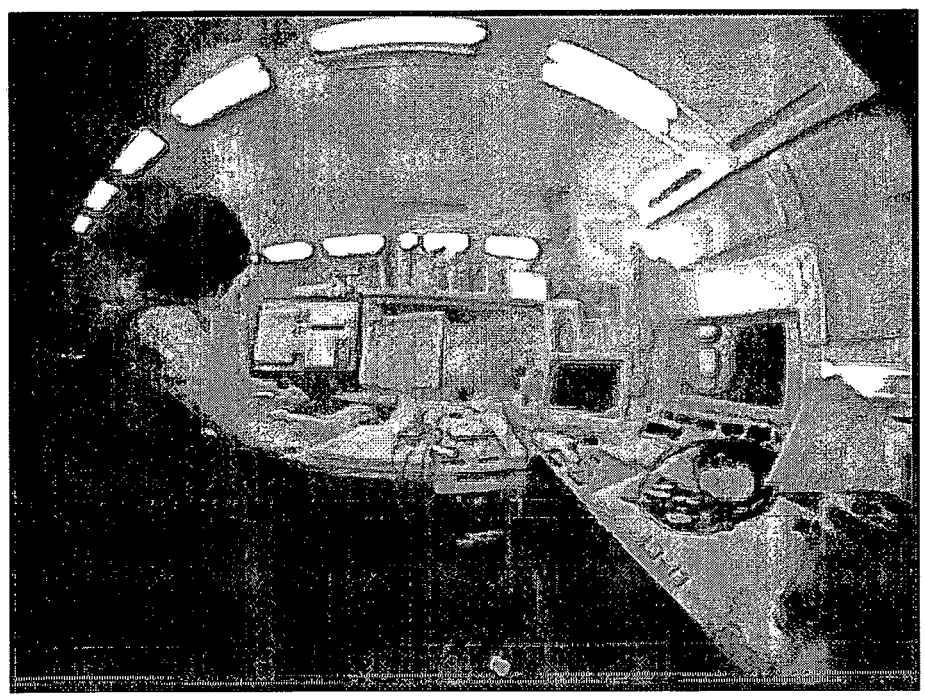
FIG. 28 illustrates exemplary image data obtained by only compressing the dynamic range of the image data illustrated in FIG. 2.

FIG. 27 illustrates exemplary image data obtained by compressing the dynamic range and removing noises from the luminance signal of the image data illustrated in FIG. 2. As a comparative example, FIG. 28 illustrates exemplary image data obtained by only compressing (without removing noises from the luminance signal) the dynamic range of the image data illustrated in FIG. 2. In the image data illustrated in FIG. 27, noises in the area of the floor indicated in an ellipse 27 are reduced and sharpness of other areas is not lost compared with the image data illustrated in FIG. 28.

Next, an operation of the image processing device 300 of the third embodiment will be described.

Figure 29:
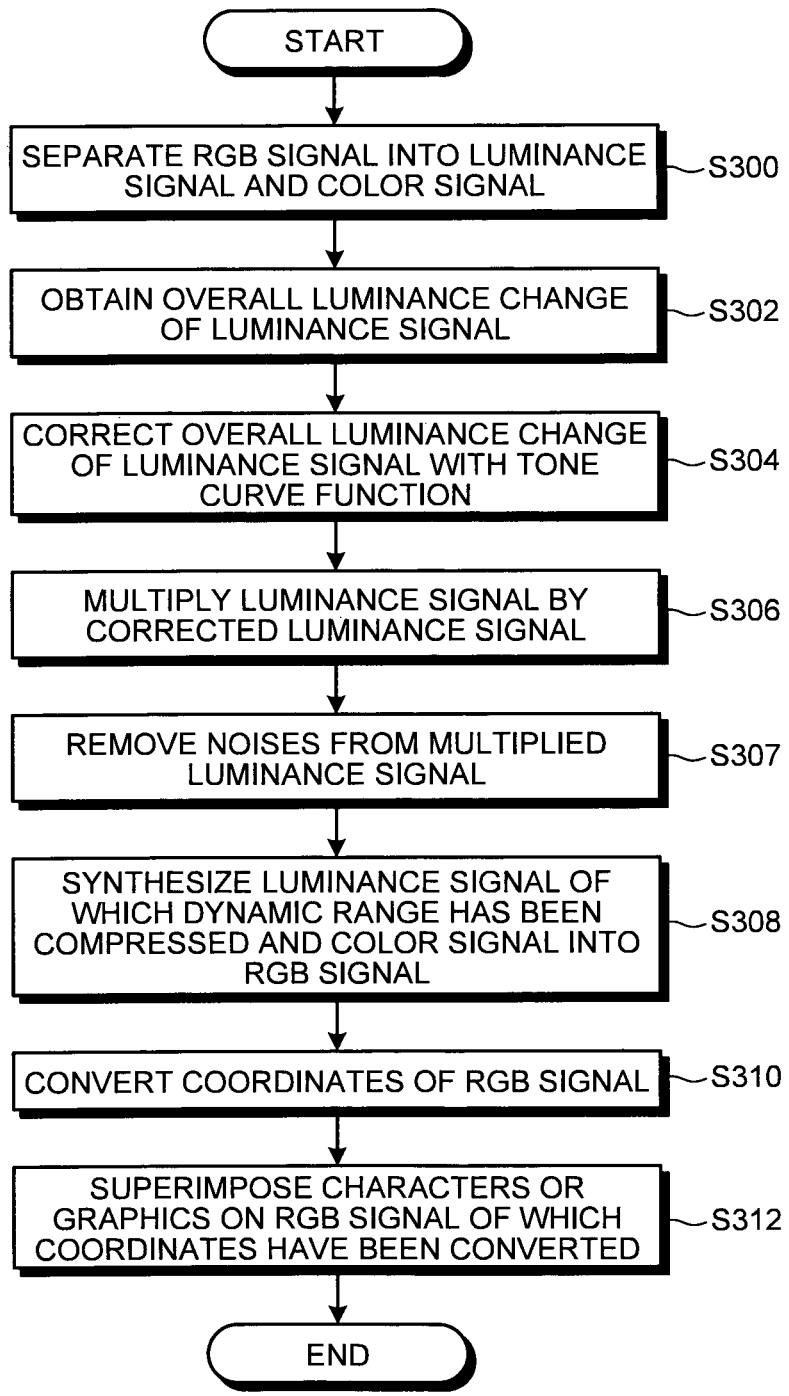
FIG. 29 is a flowchart illustrating an example of image processing carried out by an image processing device of the third embodiment.

FIG. 29 is the flowchart illustrating an exemplary flow of image processing procedures carried out in the image processing device 300 of the third embodiment.

The processes of step S300 to step S306 are the same as those of step S100 to step S106 of the flowchart illustrated in FIG. 21, and the descriptions thereof are omitted.

Subsequently, the noise remover 360 removes noises from a luminance signal amplified by the luminance dynamic range compressor 130 with intensity according to an amplification factor of the luminance signal (step S307).

The processes of step S308 to step S312 are the same as those of step S108 to step S112 of the flowchart illustrated in FIG. 21, and the descriptions thereof are omitted.

In the third embodiment, as described above, noises in an area in which a luminance signal has been amplified can be reduced without loosing sharpness of other areas excluding the area in which the luminance signal has been amplified because noises are removed from the luminance signal with intensity according to an amplification factor of the luminance signal.

Fourth Embodiment

In a fourth embodiment, an image capturing device including the image processing device of the first embodiment is described. In the following descriptions, differences from the first embodiment are mainly described. Constituents having identical functions to those in the first embodiment are denoted with like name and reference numerals, and descriptions thereof will be omitted.

Figure 30:
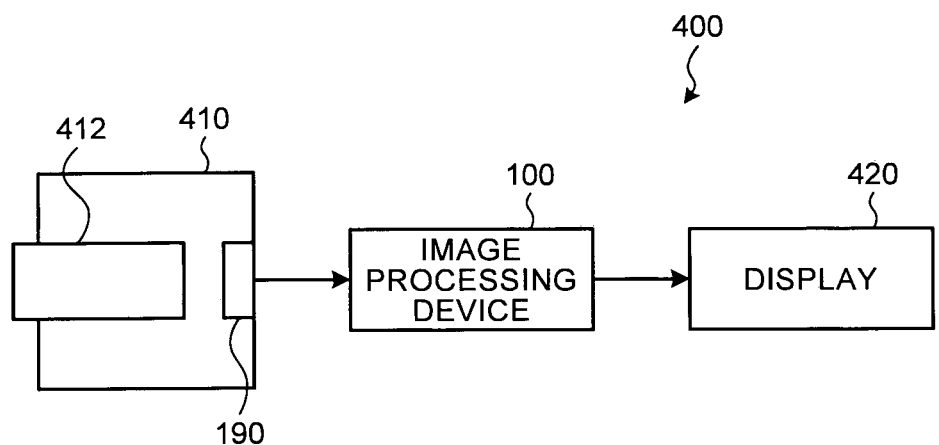
FIG. 30 is a block diagram illustrating an exemplary structure of an image capturing device according to a fourth embodiment.

FIG. 30 is a block diagram illustrating an exemplary structure of an image capturing device 400 of the fourth embodiment. The image capturing device 400 can be used for, for example, vehicle-mounted camera devices such as rear monitoring devices mounted in vehicles. As illustrated in FIG. 30, the image capturing device 400 includes a wide angle camera unit 410, the image processing device 100, and a display 420 such as a liquid crystal display (LCD) monitor. The liquid crystal display (LCD) monitor displays images (screen images) represented by image data signals output from the image processing device 100. The wide angle camera unit 410 includes a wide angle lens system 412 (an example of a wide angle optical system) having a wide angle of view, such as fisheye lenses, and the image sensor 190. The image sensor 190 forms a subject image entered through the wide angle lens system 412 onto an acceptance surface and coverts the image into image data.

Figure 31:
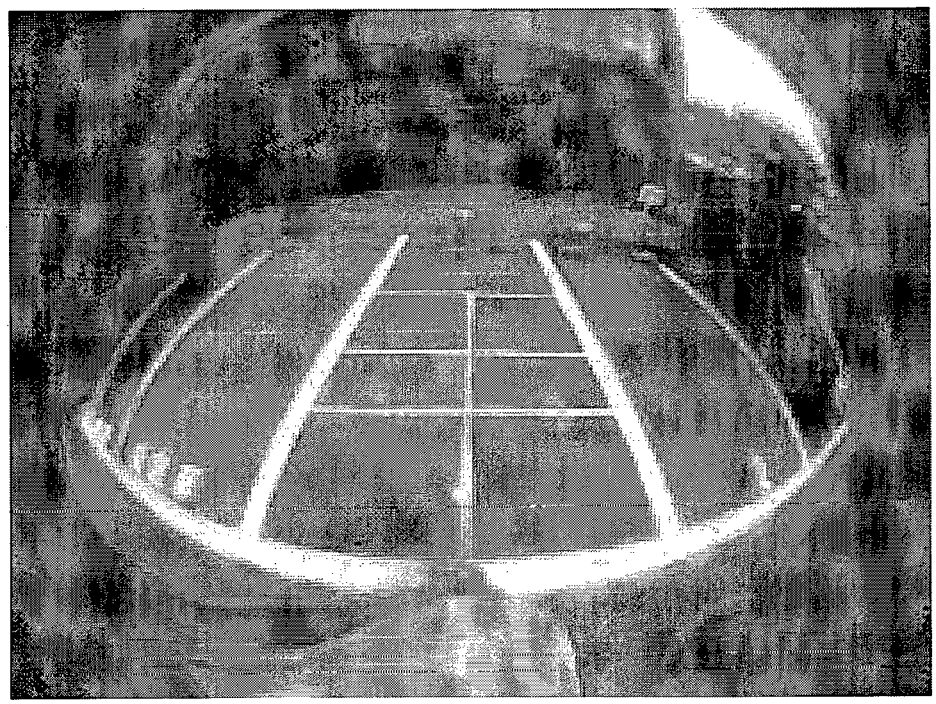
FIG. 31 illustrates exemplary image data captured by a wide angle camera unit of the fourth embodiment.

In the image capturing device 400: the wide angle camera unit 410 captures image data illustrated in FIG. 31; the image processing device 100 compresses the dynamic range of the image data captured by the wide angle camera unit 410; and the image processing device 100 produces image data illustrated in FIG. 32 or in FIG. 33. In the image data illustrated in FIG. 33, the distortion of the image data of which the dynamic range has been compressed is corrected. In the image data illustrated in FIG. 33, a normal viewpoint is converted into a top viewpoint, and then the display 420 displays the image data.

In the example illustrated in FIGS. 32 and 33, the overlay unit 180 superimposes vehicle width lines 32-1 and 33-1 showing the width of a vehicle and distance lines 32-2 and 33-2 showing a distance from the vehicle on image data that has been subjected to distortion correction or viewpoint conversion performed by the coordinate converter 170.

Figure 34:
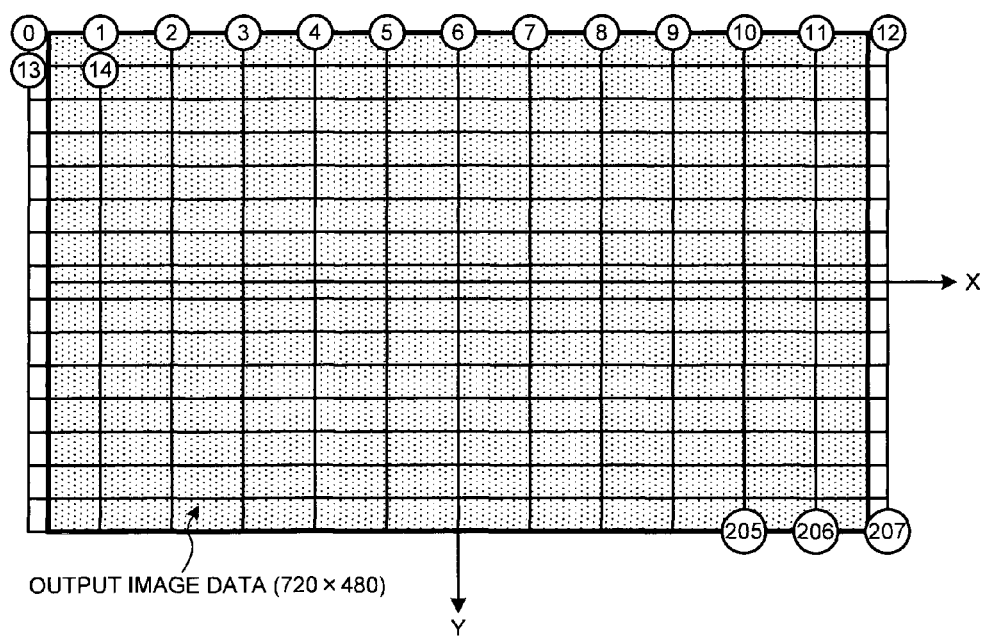
FIG. 34 is an explanatory view illustrating an exemplary coordinate conversion technique.

The vehicle-mounted cameras are required for carrying out various kinds and types of image deformations, such as distortion correction, rotation correction, down angle correction, and sub picture plane formation, depending on usage situations. This makes it difficult to achieve all kinds of image deformations with mounted LSIs because of the limitation in development costs and circuit sizes. In order to cope with the difficulty, the coordinate converter 170 (the coordinate calculator 174) of the image processing device 100 carries out the following processes: only a bilinear interpolation process that does not depend on image processing types is carried out; coordinates (a conversion table) of plural kinds of reference points utilized for bilinear interpolation are prepared by software processing executed in a controller (not shown); and the coordinates are recorded in a storage (not shown) such as read only memories (ROMs). Data to be recorded is reference points on input image data corresponding to vertexes (sampling pixels) of blocks obtained by dividing the output image data into blocks (refer to FIG. 34).

When a viewpoint of image data is converted into a top viewpoint as image data illustrated in FIG. 33, an enlargement rate of the image becomes to have a great effect. The image processing device of the first embodiment, thus, is particularly useful for being applied to vehicle-mounted camera devices such as the image capturing device of the fourth embodiment.

Modified Examples

Figure 35:
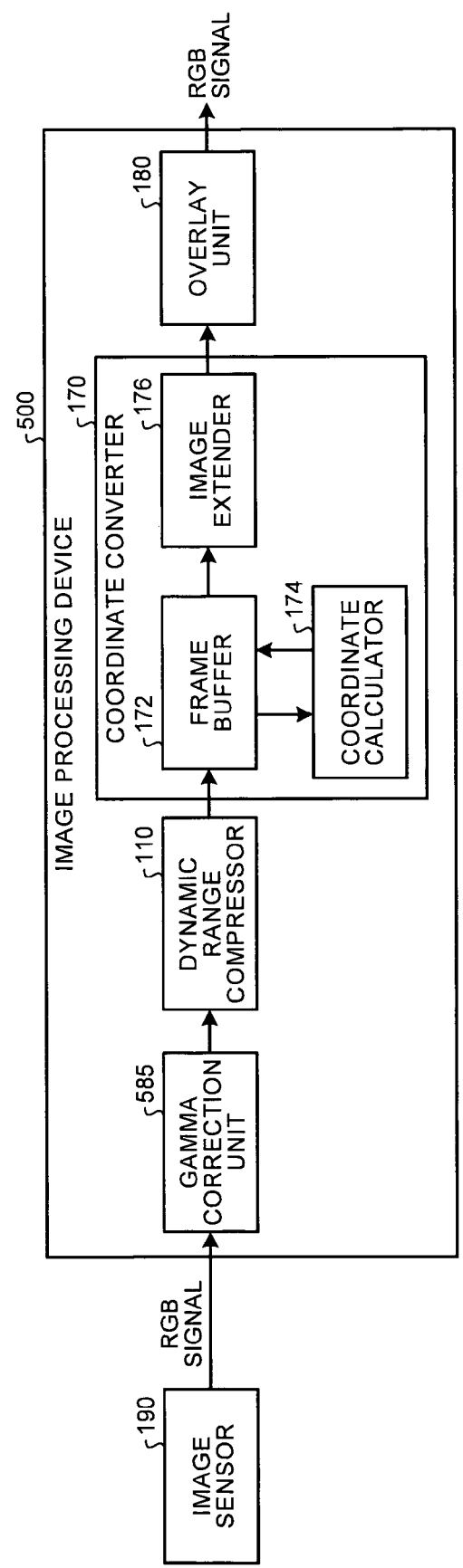
FIG. 35 is a block diagram illustrating an exemplary structure of an image processing device of a modified example.
Figure 36:
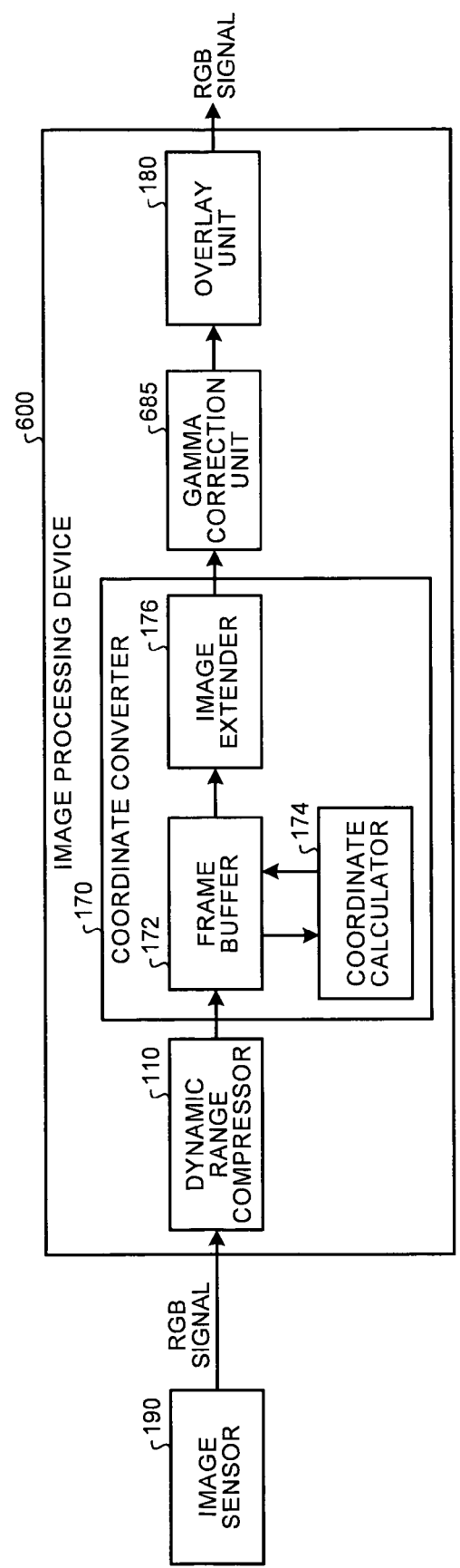
FIG. 36 is a block diagram illustrating an exemplary structure of an image processing device of another modified example.

The present invention is not limited to the above-described embodiments and various modifications can be made. For example, as illustrated in FIG. 35, an image processing device 500 may be employed that includes a gamma correction unit 585 in a preceding stage of the dynamic range compressor 110. The gamma correction unit 585 carries out gamma correction on image data by uniformly changing a characteristic of a tone curve. Alternatively, as illustrated in FIG. 36, an image processing device 600 may be employed that includes a gamma correction unit 685 in a succeeding stage of the coordinate converter 170. While the image capturing device including the image processing device of the first embodiment is described in the fourth embodiment, the image capturing device of the fourth embodiment may include the image processing device of the second or third embodiment.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

The invention claimed is:

1. An image processing device, comprising:
   a dynamic range compressor that changes a characteristic of a tone curve depending on a position on input image data so as to compress a dynamic range of the image data; and
   a coordinate converter that converts coordinates of the image data of which the dynamic range has been compressed, wherein the dynamic range compressor includes:
  an LPF unit that extracts a frequency lower than a cutoff frequency from a space frequency of a luminance signal of the input image data so as to calculate an overall luminance change of the image data, and
the LPF unit calculates the overall luminance change of the image data by
  dividing luminance image data represented by the luminance signal into a fixed number of meshes,
  calculating a sum of luminance of each of the meshes,
  preparing reduced image data by setting the calculated luminance sum as vertex data, and
  enlarging the reduced image data to the same size of the luminance image data by interpolating a midpoint of each of the meshes of the reduced image data.

2. The image processing device according to claim 1, wherein the dynamic range compressor changes the characteristic of the tone curve so as to turn a dark position on the input image data into a bright position.

3. The image processing device according to claim 1, wherein the dynamic range compressor includes:
  a tone correction unit that corrects a calculation result of the LPF unit with a tone curve function; and
  a multiplication unit that produces a multiplied luminance signal by multiplying the luminance signal and a correction result of the tone correction unit.

4. The image processing device according to claim 1, wherein enlarging the reduced image data to the same size of the luminance image data by interpolating the midpoint of each of the meshes of the reduced image data includes linearly interpolating the midpoint of each of the meshes of the reduced image data.

5. The image processing device according to claim 4, wherein the number of meshes is more than 2×2 and less than 16×16.

6. The image processing device according to claim 3, wherein the tone curve function is represented by formula (1):

$$y = A/\exp(x/B) + C \quad (1)$$

wherein y is the correction result of the tone correction unit, x is the calculation result of the LPF unit, and A, B, and C are constants.

7. The image processing device according to claim 6, wherein the tone correction unit corrects a value of y into one when the value of y is one or less.

8. The image processing device according to claim 6, wherein the tone correction unit corrects a value of y into D when the value of y is larger than D which is a constant.

9. The image processing device according to claim 6, wherein the tone correction unit retains a calculation result using the formula (1) as a table in advance, and corrects the calculation result of the LPF unit by using the calculation result retained in the table.

10. The image processing device according to claim 6, wherein the tone correction unit corrects the calculation result of the LPF unit by using a polynomial approximating the formula (1).

11. The image processing device according to claim 3, wherein the dynamic range compressor further includes a color signal booster that amplifies a color signal of the input image data according to an amplification factor of the luminance signal represented by the correction result of the tone correction unit.

12. The image processing device according to claim 3, wherein the dynamic range compressor further includes a noise remover that removes a noise from the multiplied luminance signal produced by the multiplication unit with intensity according to a an amplification factor of the luminance signal represented by the correction result of the tone correction unit.

13. The image processing device according to claim 1, further comprising a gamma correction unit that carries out gamma correction on the image data by uniformly changing the characteristic of the tone curve.

14. The image processing device according to claim 1, wherein the coordinate converter converts the coordinates of the image data of which the dynamic range has been compressed so as to carry out distortion correction or viewpoint conversion on the image data.

15. An image capturing device, comprising:
  the image processing device according to claim 1;
  a wide angle optical system; and
  an image sensor that converts a subject image entered through the wide angle optical system into image data and inputs the converted image data to the image processing device.

16. The image processing device according to claim 3, wherein the dynamic range compressor includes:
  a signal separator that separates the input image data into the luminance signal and a color signal; and
  a signal synthesizer that synthesizes the multiplied luminance signal and the color signal so as to produce the image data of which the dynamic range has been compressed.

17. The image processing device according to claim 11, wherein the dynamic range compressor includes:
  a signal separator that separates the input image data into the luminance signal and the color signal; and
  a signal synthesizer that synthesizes the multiplied luminance signal and the color signal so as to produce the image data of which the dynamic range has been compressed.

* * * * *